United States Patent [19]
Gscheidle et al.

[11] Patent Number: 6,012,005
[45] Date of Patent: Jan. 4, 2000

[54] METHOD AND APPARATUS FOR MONITORING AT LEAST ONE SENSOR

[75] Inventors: Wolfgang Gscheidle, Oberstenfeld; Klaus Haefele, Leutenbach; Dieter Woerner, Eppingen, all of Germany

[73] Assignee: Robert Bosch GmbH, Stuttgart, Germany

[21] Appl. No.: 08/920,574

[22] Filed: Aug. 29, 1997

[30] Foreign Application Priority Data

Aug. 31, 1996 [DE] Germany .......................... 196 35 440

[51] Int. Cl.⁷ .................................................. D01H 13/18
[52] U.S. Cl. ............................. 701/34; 701/63; 307/112; 307/113; 307/115; 307/116; 307/43; 340/438; 340/825; 340/825.06
[58] Field of Search ..................... 701/34, 63; 340/438, 340/825, 825.06; 307/112, 116, 115, 113, 43

[56] References Cited

U.S. PATENT DOCUMENTS

| | | | |
|---|---|---|---|
| 4,965,567 | 10/1990 | Meyer | 340/825.16 |
| 5,619,110 | 4/1997 | Sugimoto et al. | 318/450 |
| 5,631,626 | 5/1997 | Zydek et al. | 340/479 |
| 5,633,627 | 5/1997 | Newham | 340/573 |
| 5,773,901 | 6/1998 | Kantner | 307/125 |
| 5,793,284 | 8/1998 | Teague | 340/438 |
| 5,889,466 | 3/1999 | Ferguson | 340/602 |

FOREIGN PATENT DOCUMENTS

| | | |
|---|---|---|
| 34 47 449 | 7/1985 | Germany . |
| 39 30 302 | 5/1990 | Germany . |
| 42 24 266 | 3/1994 | Germany . |
| 43 24 513 | 1/1995 | Germany . |
| 42 02 761 | 10/1995 | Germany . |

*Primary Examiner*—William A. Cuchlinski, Jr.
*Assistant Examiner*—Olga Hernandez
*Attorney, Agent, or Firm*—Kenyon & Kenyon

[57] ABSTRACT

An apparatus for monitoring at least one sensor which has at least two terminals comprises first switching means and switchable means. A voltage can be applied to the first terminal of the sensor by actuation of the first switching means and a current can be established through the sensor by actuation of the first switching means and the switchable means. The apparatus also includes an analysis circuit with which at least peak voltage values can be determined from the signals generated by the sensor and conveyed to a calculation unit. Also connected to the sensor is a voltage divider which generates a signal which is also conveyed to the calculation unit. As a function of the actuation of the first switching means and switchable means, it is possible in the calculation unit, based on the peak voltage values conveyed to it, to identify a first faulty behavior of the sensor and to determine the resistance of the sensor. A determination is also made in the calculation unit, based on the signal generated with the aid of the voltage divider, as to whether a shunt or short circuit exists between the sensor and a further sensor or, for example, a supply line.

22 Claims, 15 Drawing Sheets

METHOD AND APPARATUS FOR MONITORING AT LEAST ONE SENSOR

FIELD OF THE INVENTION

The present invention relates to a method and an apparatus for monitoring at least one sensor utilized in a vehicle. In particular, the method and apparatus are used to monitor at least one inductive sensor utilized in a vehicle.

BACKGROUND INFORMATION

Methods and apparatus for monitoring at least one sensor utilized in a vehicle are known in the existing art in many modifications.

German Unexamined Patent Application No. 44 46 535 discloses a circuit arrangement for amplitude measurement in which the amplitude of the output signal of an inductive sensor is measured. The circuit arrangement includes two measurement branches, to each of which the output signal of the inductive sensor is sent. The first measurement branch determines a voltage value corresponding to the peak value of the voltage. The task of the second measurement branch is to make available, based on the output signal of the inductive sensor, switchover conditions for the components contained in the first measurement branch.

The first measurement branch is implemented as a series circuit consisting of a first amplifier, a peak value rectifier downstream from it, a second amplifier downstream from that, and a downstream collection and holding circuit. The second measurement branch is made up of a comparator and two multivibrator circuits, in particular flip-flops, downstream from it. The signals needed to influence the first measurement branch are generated by means of these multivibrator circuits. The collecting and holding circuit is influenced on the basis of the first multivibrator circuit, and the peak value rectifier is triggered by the signal generated by the second multivibrator circuit.

With the circuit arrangement indicated, it is possible to determine the quality of the output signal generated by the inductive sensor in a wide range of frequencies and voltage, by means of a plausibility check. The plausibility check is accomplished by the fact that the voltage values generated in the first measurement branch are compared with plausible voltage values.

A method for monitoring rotation speed sensors is known from German Unexamined Patent Application No. 42 11 622. This is, in particular, a method for monitoring inductive rotation speed sensors. In order to monitor these, a DC voltage signal is overlaid on each of the inductive rotation speed sensors. At the same time, one terminal of the inductive rotation speed sensor is connected to two lines which connect to a microprocessor. Using the first line, the voltage level present at the terminal of the inductive rotation speed sensor can be analyzed by means of the microprocessor. The microprocessor can deliberately modify that voltage level via the second line.

This method can be used to detect essentially two faults. The first fault—the presence of a line break or a short circuit to the connecting line—is detected by the fact that the voltage level sent via the first line to the microprocessor changes. This first fault can, however, be detected only if the voltage level has not been deliberately changed by the microprocessor via the second line. If a first fault of this kind is detected, the system can, for example, be switched off.

Since it is common for more than one inductive rotation speed sensor to be utilized in a vehicle, a second fault—a short circuit between the rotation speed sensors or their connecting lines—can also occur. If all the inductive rotation speed sensors are connected as described above, a second fault of this kind can be detected by means of the indicated method. For this, the voltage level of a first inductive rotation speed sensor is deliberately modified, via its second line, by the microprocessor. If a short circuit is present between two rotation speed sensors or their connecting lines, the voltage level of the second inductive rotation speed sensor will also change as a result of the change in voltage level at the first inductive rotation speed sensor. This change in voltage level at the second inductive rotation speed sensor can be recognized via its second line by the microprocessor. Monitoring of the first inductive rotation speed sensor via the first line must be discontinued while the arrangement is being checked for a second fault.

The article "New Alternative Solutions for Magnetoresistive Rotation Speed Sensors in Motor Vehicles" (*Neue, alternative Lösungen für Drehzahlsensoren im Kraftfahrzeug auf magnetoresistiver Basis*, VDI-Berichte No. 509, 1984, pp. 263–268), and the article "Integrated Hall-effect Sensors for Detecting Position and Rotation Speed" (*Integrierte Hall-Effekt-Sensoren zur Positions- und Drehzahlerkennung*, elektronik industrie 7, 1995, pp. 29-3), both indicate sensors for use in motor vehicles in systems for controlling or regulating antilock braking systems, automatic slip systems, and the engine and transmission, with which rotary motions can be detected.

It is an object of the present invention to improve the monitoring of sensors utilized in vehicles, in particular of inductive sensors.

SUMMARY OF THE INVENTION

An advantage of the present invention is that the apparatus and the method according to the present invention contain further capabilities for testing and checking a sensor in addition to those already known in the art. To implement these further capabilities for testing and checking a sensor, the apparatus according to the present invention includes a first switching means connected to a first terminal of the sensor and with which a voltage can be applied to the first terminal of the sensor. The apparatus further contains switchable means which are connected to a second terminal of the sensor and with which a current through the sensor can be established.

In order to be able to analyze the potentials occurring at the terminals of the sensor, the apparatus contains, for this purpose, analysis means that are connected to the terminals of the sensor. The analysis means includes at least a first and a second circuit group which are each connected at least to the first and the second terminals of the sensor. A calculation unit is provided to process the signals generated by the two circuit groups, and to trigger the first switching means and the switchable means. By means of the first circuit group—which includes a difference-forming means which is connected to the first and the second terminals of the sensor, a means downstream from this for determining peak voltage values, and a downstream means for storing the peak voltage values—peak voltage values are determined based on the potentials occurring at the terminals of the sensor and are conveyed to the calculation unit.

The second circuit group includes a comparison means with which a pulse train is determined based on the potentials occurring at the terminals of the sensor, and is also conveyed to the calculation unit. Based on that pulse train, signals are generated with which, among other things, the means for storing the peak voltage values is triggered. Also provided is a voltage divider which is connected to the first and second terminals of the sensor. This voltage divider generates a signal which depends on the potential occurring at the terminals of the sensor and is conveyed to the calculation unit.

One advantage of the apparatus and method according to the present invention is that the first switching means and the switchable means can be triggered separately from one another. As a result, different conditions can be established at the sensor. Actuating the first switching means causes a voltage to be applied to the first terminal of the sensor. Actuating the first switching means and the switchable means causes a current to be established through the sensor. If neither the first switching means nor the switchable means is actuated, the potentials occurring at the terminals of the sensor remain unaffected.

Provided in the calculation unit are means with which the peak voltage values generated by the first circuit group can be analyzed as a function of actuation of the first switching means and switchable means.

In another advantageous embodiment according to the present invention, means are provided in the calculation unit with which, if the first switching means and the switchable means are not actuated, a first faulty behavior of the sensor can be detected based on the peak voltage values conveyed to the means and a comparison with a first and a second threshold.

In a further advantageous embodiment according to the present invention, the calculation unit contains means with which, if the first switching means and the switchable means are actuated, a value for the resistance of the sensor is determined based on the peak voltage values conveyed to the means. This value for the resistance of the sensor is checked on the basis of a comparison with a third and a fourth threshold.

It is particularly advantageous if the detection of the first faulty behavior of the sensor and/or the determination or check of the resistance value are performed, for example, if a magnitude describing the vehicle behavior lies within a range that is described by a fifth and sixth threshold.

Also provided in the calculation unit are, for example, means with which the signal generated by the voltage divider can be analyzed. With this means it is possible, if the first switching means and the switchable means are not actuated, to detect whether a shunt or short circuit exists between the sensor or its connecting lines and a line carrying the supply voltage or a ground line.

To detect a shunt or short circuit between two sensors or their connecting lines, for example, the first switching means of a first sensor are actuated, and the switchable means of a first sensor are not actuated. Based on the signal occurring at the voltage divider of a second sensor, it is possible to detect with suitable means whether the shunt or short circuit exists.

The apparatus and method of the present invention can advantageously be utilized in the context of a system in which, for example, inductive sensors, as used, for example, for sensing wheel rotation velocity, crankshaft velocity, or camshaft velocity, are utilized. Utilization of the apparatus and/or method according to the present invention improves the recognition of possible faults in the sensors utilized, and consequently improves the operation of the entire system. Suitable systems in which the apparatus and/or method according to the present invention can be utilized include, for example, antilock braking regulating systems or automatic slip or vehicle dynamics control systems.

BRIEF DESCRIPTION OF THE DRAWINGS

In the Figures, identical components are identified by the same numbers.

DETAILED DESCRIPTION OF THE INVENTION

The present invention will now be described with reference to an exemplifying embodiment, with the aid of FIGS. 1 to 13. The specific form of the exemplifying embodiment selected is not intended to constitute any restriction on the present invention.

Figure 1:
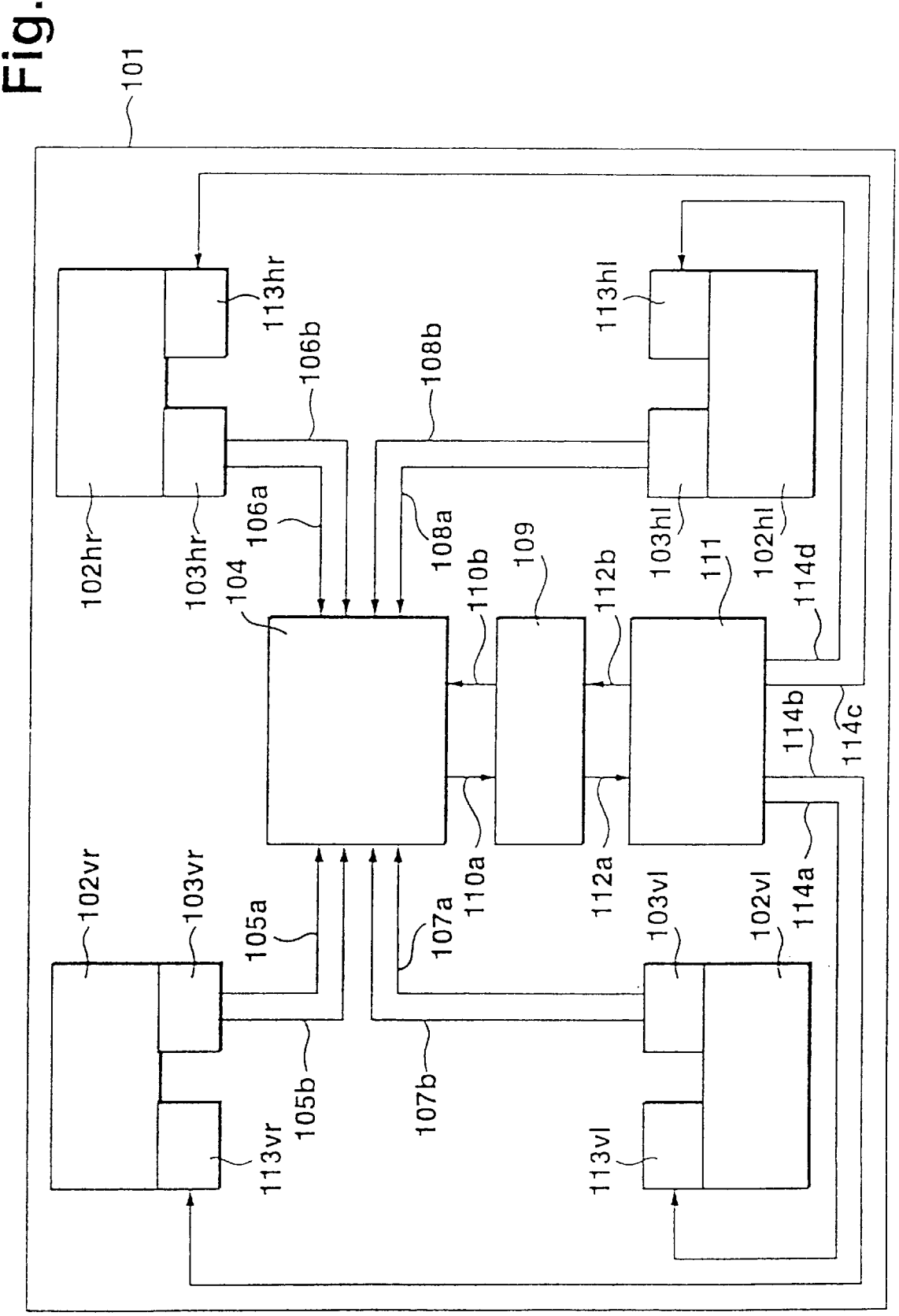
FIG. 1 shows a schematic view of an exemplary apparatus according to the present invention incorporated into a vehicle equipped with a brake pressure regulating system.

In FIG. 1, a general block diagram shows the manner in which the apparatus according to the present invention is incorporated into a vehicle equipped with a brake pressure regulating system. 101 designates the vehicle. 102*vr*, 102*hr*, 102*vl*, and 102*hl* identify the wheels of the vehicle. The simplifying notation 102*ij* will be used hereinafter for the wheels of the vehicle; the index I indicates whether the wheel is located on the rear axle (h) or the front axle (v). Index j indicates the allocation to the right (r) or left (l) side of the vehicle. This identification by means of the two indices I and j applies correspondingly to all magnitudes or components for which it is used.

The apparatus and method according to the present invention will be explained with reference to a vehicle equipped with a brake pressure regulating system. The brake pressure regulating system may be, for example, an antilock braking regulating system, or an automatic slip control system. In both cases the inductive sensors associated with the wheels, i.e., the wheel rotation speed sensors, can be regarded as the sensors that are to be monitored with the aid of the apparatus and method according to the present invention. The description of the apparatus and method according to the present invention with reference to the monitoring of wheel rotation speed sensors is not intended to constitute any restriction. The apparatus and method according to the present invention can of course also be utilized to monitor, for example, sensors for detecting the rotation speed of the camshaft or the crankshaft.

Associated with each wheel 102ij is a wheel rotation speed sensor 103ij that is implemented by means of an inductive sensor. Wheel rotation speed sensor 103ij senses the wheel rotation speed of wheel 102ij and generates corresponding signals. FIG. 1 also contains a block 104 which represents the apparatus according to the present invention, and in which the method according to the present invention is executed. The signals generated by wheel rotation speed sensors 103ij are essentially the potentials present at the terminals of wheel rotation sensors 103ij, which are conveyed to block 104 for further processing.

Since the wheel rotation speed sensors 103ij considered in this exemplifying embodiment are intended to have two terminals, the two potentials present at the terminals of each wheel rotation speed sensor 103ij must be conveyed to block 104. For this purpose, wheel rotation sensor 103vr is connected via two lines 105a and 105b to block 104. In the same fashion, wheel rotation speed sensor 103hr is connected via the two lines 106a and 106b to block 104. The two potentials present at the terminals of wheel rotation speed sensor 103vl are conveyed via two lines 107a and 107b to block 104. The same applies for wheel rotation speed sensor 103hl, which is connected to block 104 via two lines 108a and 108b. The apparatus according to the present invention, block 104, is connected via two lines 110a and 110b to a control unit 109 required for the brake pressure regulating system. Signals are transmitted via line 110a from block 104 to block 109. Signal transmission from block 109 to block 104 takes place by means of line 110b.

If an antilock braking regulating system is used in the vehicle as the brake pressure regulating system, block 109 then constitutes, for example, an antilock braking control unit. If, on the other hand, an automatic slip control system is utilized as the brake pressure regulating system, block 109 then constitutes, for example, an automatic slip control unit. Block 109 is connected via two lines 112a and 112b to block 111. Signals from block 109 to block 111 are transferred via line 112a. Signal transmission from block 111 to block 109 takes place by means of line 112b. Block 111 includes, for example, a hydraulic control device with which actuators 113ij associated with wheels 102ij are triggered. For this purpose, actuator 113vl is connected to block 111 via a line 114a, actuator 113vr via a line 114b, actuator 113hr via a line 114c, and actuator 113hl via a line 114d. By means of actuators 113ij, the wheel brake cylinder pressure acting at the respective wheel 102ij can be varied.

Figure 2:
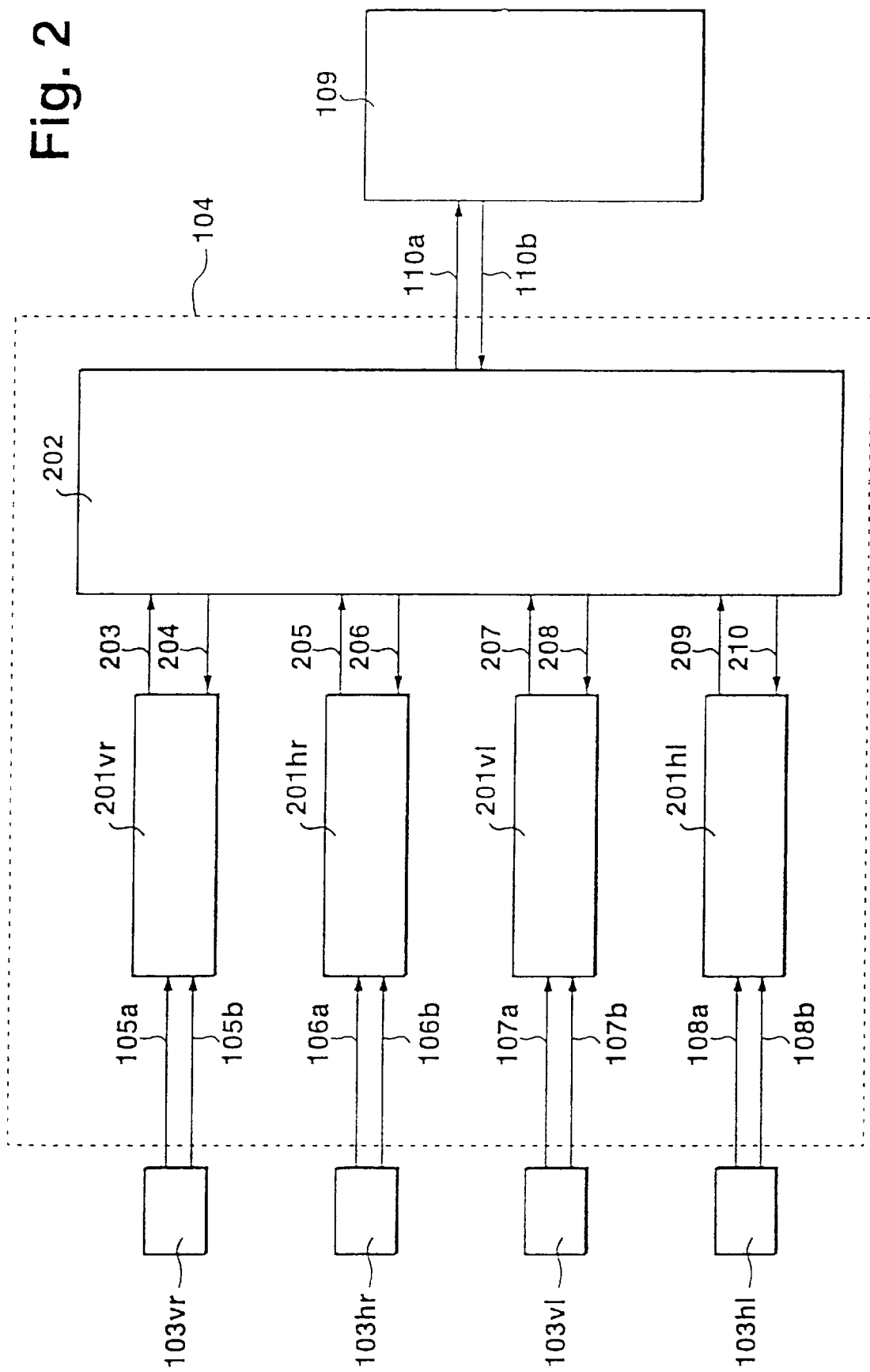
FIG. 2 shows a schematic view of a portion of the apparatus of FIG. 1 in greater detail.

FIG. 2 depicts the apparatus according to the present invention, block 104, in more detail. As FIG. 2 shows, a block 201ij is associated with each wheel rotation speed sensor 103ij. Wheel rotation speed sensor 103vr is connected to block 201vr via lines 105a and 105b. Wheel rotation speed sensor 103hr is connected to block 201hr via lines 106a and 106b. Wheel rotation speed sensor 103vl is connected to block 201vl by means of lines 107a and 107b. Wheel rotation speed sensor 103hl and block 201hl are connected to one another via lines 108a and 108b. Blocks 201ij constitute analysis means with which the signals generated by wheel rotation speed sensor 103ij, or the potentials present at the terminals of wheel rotation speed sensors 103ij, are processed. Blocks 201ij are connected to a block 202 which is a calculation unit.

Signals are transmitted from block 201vr to calculation unit 202 via a line 203. Signals that are generated in calculation unit 202 are conveyed to block 201vr via a line 204. The signals generated in block 201hr are conveyed to calculation unit 202 via a line 205. At the same time, block 201hr receives, via a line 206, the signals generated by calculation unit 202. Block 201vr is connected to calculation unit 202 via two lines 207 and 208. Signals from block 201vr are transmitted to calculation unit 202 via line 207, and signals from calculation unit 202 are transmitted to block 201vr via line 208. Block 201hl is linked to calculation unit 202 via two lines 209 and 210. Signal transmission from block 201hl to calculation unit 202 takes place by means of line 209. The signals generated by calculation unit 202 are conveyed via line 210 to block 201hl. Calculation unit 202 is connected via lines 110a and 110b to control unit 109. Signals generated in calculation unit 202 are conveyed to control unit 109 via line 110a. At the same time, signals generated in control unit 109 are conveyed via line 110b to calculation unit 202.

It should be noted that in the present description, the term "line" is not used exclusively to describe an individual connection between two blocks. Instead, the term "line" can also be used as a comprehensive designation for multiple connections existing between two blocks. Line 204 drawn in FIG. 2 is used, for example, in this sense. As FIG. 3 shows, line 204 is composed of lines 204a, 204b, 204c, and 204d.

Figure 3:
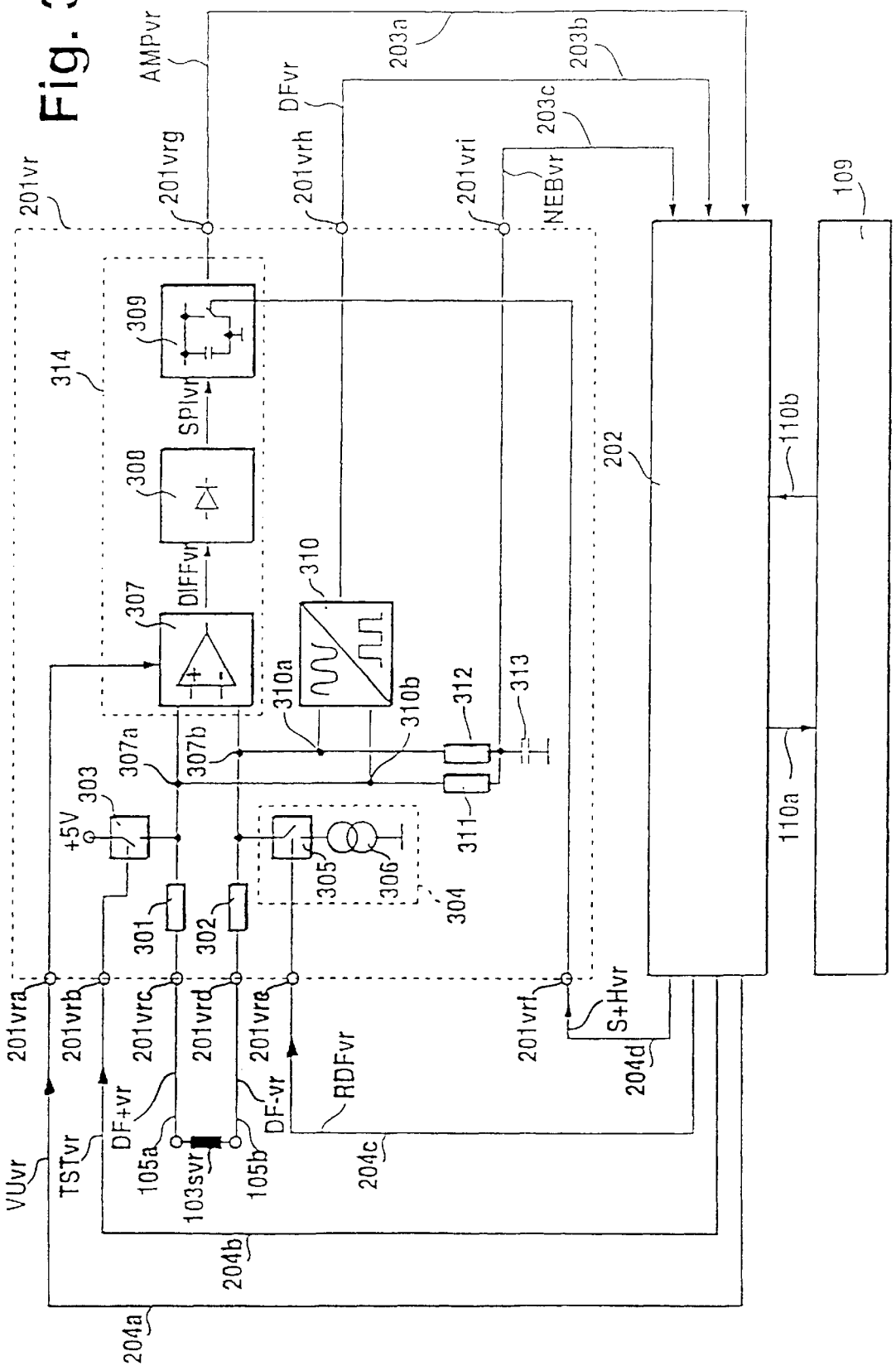
FIG. 3 shows a schematic view of an analysis means, a calculation unit, and a control unit according to an embodiment of the present invention.

The construction of the identical blocks 201ij is presented in more detail with reference to FIG. 3. To this end, FIG. 3 depicts, in exemplifying fashion, analysis means 201vr for wheel rotation speed sensor 103vr. The particular selection of analysis means 201vr is not intended to constitute any restriction.

For the exemplifying embodiment, it is assumed that the wheel rotation speed sensor 103ij in question is, for example, an inductive sensor, sufficiently known from the existing art, which includes a stationary coil 103sij and a rotor, joined immovably to wheel 102ij, which is not depicted in the Figures. The sensor in question is preferably intended to generate a constant periodic signal. Of course it is also possible to use sensors with a different physical construction; for example, a so-called Hall sensor can also be utilized as the wheel rotation speed sensor.

Several terms and wordings used in the exemplifying embodiment will now be described. When discussing the application of a voltage to the first terminal of sensor 103ij, what is meant according to the exemplifying embodiment is that the voltage is applied to the terminal of coil 103sij that is connected to line 105a. In addition, the potentials occurring at the terminals of sensor 103ij are intended to be the potentials occurring at the terminals of coil 103sij. The current that can be established through the sensor is intended, according to the exemplifying embodiment, to flow through coil 103*sij* of sensor 103*ij*. The resistance of sensor 103*ij* is meant, in particular, to be the ohmic resistance of coil 103*sij*. The first faulty behavior of sensor 103*ij*, which manifests itself in fluctuations or changes in the signal generated by sensor 103*ij*, is understood to be caused by faults occurring at the rotor of the sensor. Faults at the rotor can, for example, be vertical or lateral runout of the rotor, a damaged or broken rotor tooth, or metallic contamination of the rotor. A shunt or short circuit of sensor 103*ij* to a line carrying supply voltage, a ground line, or another sensor can come into being by the fact that an electrical connection exists between coil 103*sij* or its connecting lines and the aforementioned components. The term "first faulty behavior" is meant to encompass these and similar faulty behaviors.

Coil 103*svr* of wheel rotation speed sensor 103*vr* is connected via line 105*a* to terminal 201*vrc*, and via line 105*b* to terminal 201*vrd*, of analysis means 201*vr*. Signal DF+vr generated by wheel rotation speed sensor 103*vr* is conveyed via line 105*a* to analysis means 201*vr*. Correspondingly, signal DF−vr is conveyed to analysis means 201*vr* via line 105*b*. The signals are the signals present at the two terminals of coil 103*svr* that are also intended to be present simultaneously at the two terminals of wheel rotation speed sensor 103*vr*.

The first terminal of a component 301 is connected to terminal 201*vrc* of analysis means 201*vr*. The second terminal of component 301 is connected to terminal 307*a* of a differenceforming means 307 as is known in the art. A component 302 is connected, with its first terminal, to terminal 201*vrd* of analysis means 201*vr*. The second terminal of component 302 is connected to terminal 307*b* of difference-forming means 307. Resistors are preferably used for components 301 and 302.

Also connected to terminal 307*a* of difference-forming means 307 is the first terminal of a first switching means 303. The second terminal of first switching means 303 is connected to terminal 201*vrb* of analysis means 201*vr*. The third terminal of first switching means 303 is connected to a supply voltage, for example +5V. First switching means 303 is configured in such a way that when a suitable signal is applied to its second terminal, the supply voltage present at the third terminal of the first switching means is switched to the first terminal and thus, via component 301, to coil 103*svr* of wheel rotation speed sensor 103*vr*. A semiconductor transmitter, the base of which constitutes the second terminal, is preferably utilized as first switching means 303.

Switchable means 304 are connected to terminal 307*b* of difference-forming means 307. Switchable means 304 include a second switching means 305 and a current source 306. Current source 306 is in this context to be configured so that with it, for example, a current having a predefined value and/or having a predefined profile over time can be established. Second switching means 305 is connected, at its first terminal, to terminal 307*b* of difference-forming means 307. The second terminal of second switching means 305 is connected to terminal 201*vre* of analysis means 201*vr*. The third terminal of second switching means 305 is connected to the first terminal of current source 306. The second terminal of current source 306 is connected to ground. When a suitable signal is applied to the second terminal of second switching means 305, current source 306 is connected, via the first terminal of second switching means 305 and via component 302, to coil 103*svr* of wheel rotation speed sensor 103*vr*. Corresponding to first switching means 303, second switching means 305 can, for example, also be configured as a semiconductor transistor.

The arrangement of first switching means 303 and of switchable means 304 makes it possible, simply by actuating first switching means 303, to apply a voltage to the first terminal of wheel rotation speed sensor 103*vr* and to the first terminal of coil 103*svr* of wheel rotation speed sensor 103*vr*. When first switching means 303 and switchable means 304 are actuated, it is possible to establish a current through coil 103*svr* and thus through sensor 103*vr*.

The first terminal of a component 311 is simultaneously connected to terminal 307*a* of difference-forming means 307 and to terminal 310*b* of comparison means 310. The first terminal of a component 312 is, in the same fashion, connected to terminal 307*b* of difference-forming means 307 and to terminal 310*a* of comparison means 310. The two components 311 and 312 are connected to one another via their second terminals. In addition, the second terminals of components 311 and 312 are simultaneously connected to terminal 201*vri* of analysis means 201*vr* and to the first terminal of a component 313. The second terminal of component 313 is connected to ground. Resistors are preferably utilized as components 311 and 312. A capacitor is used as component 313.

Difference-forming means 307 is part of a first circuit group 314, to which means 308, as is known in the art, for determining peak voltage values, and means 309, also known in the art, for storing the peak voltage values, also belong. The difference signal DIFFvr is generated by means of difference-forming means 307 on the basis of signals DF+vr and DF−vr generated by wheel rotation speed sensor 103*vr*. The difference signal is conveyed to means 308, downstream from difference-forming means 307, for determining peak voltage values.

Based on the difference signal DIFFvr, means 308 generates signal SPIvr which represents the peak voltage values of the difference signal DIFFvr. Signal SPIvr, or the peak voltage values, are conveyed to means 309, downstream from means 308, for storing the peak voltage values. With the aid of means 309, signal SPIvr can be stored for a time period predefined by calculation unit 202. The stored peak voltage values are forwarded from means 309 to terminal 201*vrg* of analysis means 201*vr*, and are present there as signal AMPvr. In order to allow predefinition by calculation unit 202 of the time period during which the peak voltage values are to be stored in means 309, one terminal of means 309 is connected to terminal 201*vrf* of analysis means 201*vr*.

A subtracting or differential amplifier, with which signal DIFFvr can be placed in a suitable value range based on signals DF+vr and DF−vr generated by the wheel rotation speed sensor, can preferably be used for difference-forming means 307. For example, the subtracting amplifier can be configured with an operational amplifier. Variable gain of difference-forming means 307 is particularly advantageous. Since signals DF+vr and DF−vr generated by wheel rotation speed sensor 103*vr* are proportional to the velocity of wheel 102*vr*, they are smaller in the lower velocity range than in the higher velocity range. Equalization of the signal amplitudes can consequently be accomplished by amplifying the signals in the lower velocity range by means of difference-forming means 307, and damping them in the upper velocity range by means thereof. In order for the gain of difference-forming means 307 to be influenced, one of its terminals is connected to terminal 201*vra* of analysis means 201*vr*.

The means for determining peak voltage values 308 can, for example, be implemented as a peak value rectifier, in particular as an active peak value rectifier. A so-called sample-and-hold element, which includes a capacitor and a switch connected in parallel therewith, can be utilized as means 309 to store the peak voltage values. The peak voltage values can be stored by means of the capacitor, and can be erased again by means of the switch.

It should be noted that in addition to the analog implementation described above for first circuit group 314, with which peak voltage values AMPvr can be determined based on the potentials DF+vr and DF−vr occurring at the terminals of wheel rotation speed sensor 103vr, a digital implementation is also possible. For the digital implementation, difference-forming means 307, means 308 for determining peak voltage values, and means 309 for storing the peak voltage values are not necessary. In this case it is sufficient if, for example, signal DF+vr generated by wheel rotation speed sensor 103vr is sent to an analog/digital converter contained in calculation unit 202, and the latter is analyzed in order to generate signal AMPvr by means of a suitable algorithm.

With the aid of a comparison means 310, known in the art, which represents a second circuit group, a pulse train DFvr is determined on the basis of potentials DF+vr and DF−vr occurring at the terminals of wheel rotation speed sensor 103vr, and is output via terminal 201vrh. Comparison means 310 is implemented, for example, with the aid of a comparator, which converts the (normally periodic) signals generated by wheel rotation speed sensor 103vr into a corresponding pulse train.

Analysis means 201vr is connected via various lines to calculation unit 202. The peak voltage values AMPvr present at terminal 201vrg are conveyed to calculation unit 202 via a line 203a. Pulse train DFvr, which is present at terminal 201vrh, is conveyed by means of line 203b to calculation unit 202. Terminal 201vri of analysis means 201vr is connected via a line 203c to the calculation unit. As a result, signal NEBvr generated by the voltage divider implemented by components 311 and 312 is sent to calculation unit 202. Calculation unit 202 is connected via a line 204d to terminal 201vrf of analysis means 201vr.

Signal S+Hvr, generated by calculation unit 202 in order to trigger means 309, is conveyed via line 204d to means 309. Calculation unit 202 is connected to terminal 201vre via a line 204c. Second switching means 305 of switchable means 304 is triggered by means of signal RDFvr generated by calculation unit 202. To trigger first switching means 303, signal TSTvr generated by calculation unit 202 is conveyed via a line 204b to terminal 201vrb. To allow adjustment of the gain factor of difference-forming means 307, calculation means 202 is connected via a line 204a to terminal 201vra. Signal VUvr generated by the calculation unit is transmitted via line 204a.

Calculation unit 202 is also connected via lines 110a and 110b to control unit 109.

The configuration of analysis means 201vl, 201hr, and 201hl corresponds to that of analysis means 201vr. Corresponding signals are generated by these analysis means, and they are triggered by calculation unit 202 by means of corresponding signals.

Figure 4:
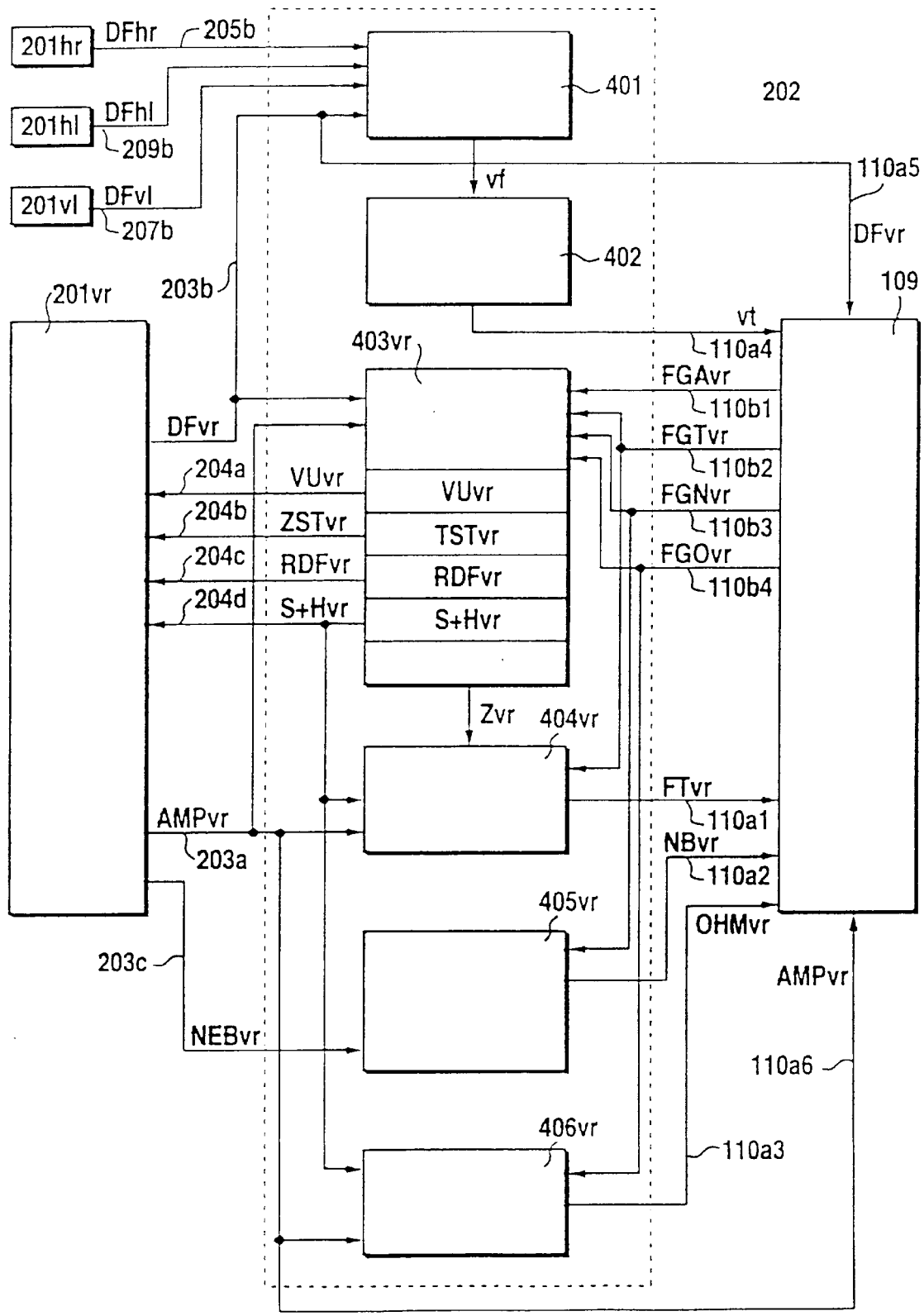
FIG. 4 shows a detailed schematic view of a calculation unit according to an embodiment of the present invention, assuming one sensor.

FIG. 4 depicts the configuration of calculation unit 202 in a detailed block diagram. The components depicted in calculation unit 202 were principally only those necessary for processing of the signals generated by wheel rotation speed sensor 103vr. Corresponding components are necessary in terms of wheel rotation speed sensors 103vl, 103hr, and 103hl. Exclusive consideration of the components necessary for wheel rotation speed sensor 103vr is not intended to constitute any restriction.

Pulse trains DFij generated by analysis means 201ij, with which vehicle speed vf is determined, are conveyed to block 401 contained in calculation unit 202. Pulse train DFvr is conveyed to block 401 via a line 203b, pulse train DFhr via a line 205b, pulse train DFvl via a line 207b, and pulse train DFhl via a line 209b. Control unit 109 also receives, via a line 110a5, pulse train DFvr generated by analysis means 201vr.

Vehicle speed vf is determined by means of block 401 from pulse trains DFij which are converted for that purpose into analog values in block 401. This determination of vehicle speed can be accomplished, for example, by averaging or by another conventional method. Signal vf, which represents the vehicle speed, is conveyed to a block 402. The vehicle behavior is assessed by means of block 402. A variety of magnitudes or criteria can be employed in assessing the vehicle behavior. For example, signal vf representing the vehicle speed can be compared with a fifth and with a sixth threshold. If the value of signal vf lies within the band described by the fifth and sixth thresholds, favorable vehicle behavior exists for a portion of the analyses of wheel rotation speed sensor 103vr that are to be performed, and signal vt, which is output by block 402, is set. If the value of signal vf lies outside the band, favorable vehicle behavior does not exist, and signal vt is not set. Signal vt is transmitted via a line 110a4 from block 402 to control unit 109. In addition to vehicle speed vf, it is also possible to take into account in assessing the vehicle behavior, for example, the derivative over time of the vehicle speed, i.e., the vehicle acceleration, or other magnitudes.

Block 403vr contained in calculation unit 202 is used to trigger analysis means 201vr. To generate the corresponding signals, block 403vr receives the following input signals. Pulse train DFvr is conveyed to block 403vr via line 203b. Peak voltage values AMPvr are conveyed to block 403vr via line 203a. From control unit 109, signal FGAvr is transmitted to block 403vr via a line 110b1, signal FGTvr via a line 110b2, signal FGNvr via a line 110b3, and signal FGOvr via a line 110b4. The operation of block 403vr is coordinated by means of these signals.

Signal FGAvr represents a general enabling signal with which block 403vr and thus analysis means 201vr can be enabled. The output of signals TSTvr and RDFvr of block 403vr is coordinated on the basis of signal FGTvr. In addition, signal FGTvr serves to enable a block 404vr. For this purpose, signal FGTvr is conveyed from control unit 109 vi a line 110b2 into block 404vr. Signals TSTvr and RDFvr output from block 403vr are influenced by means of signal FGNvr. In addition, signal FGNvr activates a block 405vr. For this purpose, signal FGNvr is conveyed to block 405vr via line 110b3. Signal FGOvr influences signals TSTvr and RDFvr output from block 403vr. Signal FGOvr, which is conveyed via line 110b4 to a block 406vr, also activate s the latter.

Signal vt participates in the determination of signals FGTVr and FGOvr. Signal vt must be set in order for signals FGTvr and FGOvr to be set, i.e., the vehicle speed vf must lie within the band described by the fifth and sixth thresholds. The fifth and sixth thresholds are selected, for example, in such a way that signal vt is set for low vehicle speeds.

Signal VUvr, with which the gain of difference-forming means 307 can be established, is generated in block 403vr. For this purpose, signal VUvr is conveyed to analysis means 201vr via line 204a. Also generated in block 403vr is signal TSTvr, with which first switching means 303 are actuated. Signal TSTvr is sent via line 204b to analysis means 201vr.

Signal RDFvr which is required in order to trigger switchable means 304 is conveyed via line 204*c* from block 403*vr* to analysis means 201*vr*. Signal S+Hvr generated by block 403*vr* is conveyed by means of line 204*d* to block 201*vr*. In addition, blocks 404*vr* and 406*vr* are acted upon by signal S+Hvr via line 204*d*.

In addition to signal S+Hvr, signal Zvr generated by a counter contained in block 403*vr* is also conveyed to block 404*vr*. The counter can be used to determine one complete revolution of the pulse wheel contained in wheel rotation speed sensor 103*vr*. If, for example, a pulse wheel is used which has an initialization mark, the counter can be reset by means of the initialization mark. In the time between a first and a second resetting of the counter, the number of pulse wheel teeth that have passed by stationary coil 103*svr* can be determined by means of the counter. The value of the counter thus reflects the number of pulse wheel teeth that have passed. In addition, peak voltage values AMPvr generated in block 201*vr* are conveyed to block 404*vr* via line 203*a*. A first faulty behavior of sensor 103*vr*, or the quality of the pulse wheel, is determined as a function of peak voltage values AMPvr or counter status Zvr.

Peak voltage values AMPvr, which are determined with the aid of first circuit group 314, represent a so-called envelope of the signals generated by wheel rotation speed sensor 103*vr*. Since peak voltage values AMPvr, and therefore the envelope, are employed in block 404*vr* to evaluate the quality of the pulse wheel of wheel rotation speed sensor 103*vr*, the operation in block 404*vr* is referred to as "envelope analysis". Signal FTvr is generated in block 404*vr* as a function of that analysis, and conveyed to control unit 109 via a line 110*a*1.

Signal NEBvr, which is generated in block 201*vr* and conveyed to block 405*vr* via line 203*c*, is analyzed in block 405*vr*. On the basis of signal NEBvr, a determination can be made in block 405*vr* as to whether a shunt or short circuit exists between wheel rotation speed sensor 103*vr* and a ground line or a line carrying supply voltage. It is also possible to determine in block 405*vr*, on the basis of signal NEBvr, whether a shunt or short circuit exists between wheel rotation speed sensor 103*vr* and another wheel rotation speed sensor 103*vl*, 103*hr*, or 103*hl*. It should be noted in this context that in the case of the second type of investigation, shunts or short circuits between wheel rotation speed sensor 103*vr* and sensors other than the wheel rotation speed sensor can also be detected. A corresponding wiring configuration, as depicted in FIG. 3 by components 311 and 312, would be necessary for this purpose. Signal NBvr is generated in block 405*vr* on the basis of the result determined, and conveyed via a line 110*a*2 to control unit 109.

All the statements for block 405*vr* apply for the corresponding blocks of the other wheel rotation speed sensors 103*vl*, 103*hr*, and 103*hl*.

In addition to signal S+Hvr, signal AMPvr is conveyed to block 406*vr* via line 203*a*. On the basis of these two signals, the resistance value of coil 103*svr* of wheel rotation speed sensor 103*vr* is determined in block 406*vr*. The determined value OHMvr of the coil resistance is conveyed to control unit 109 via a line 110*a*3.

Figure 5:
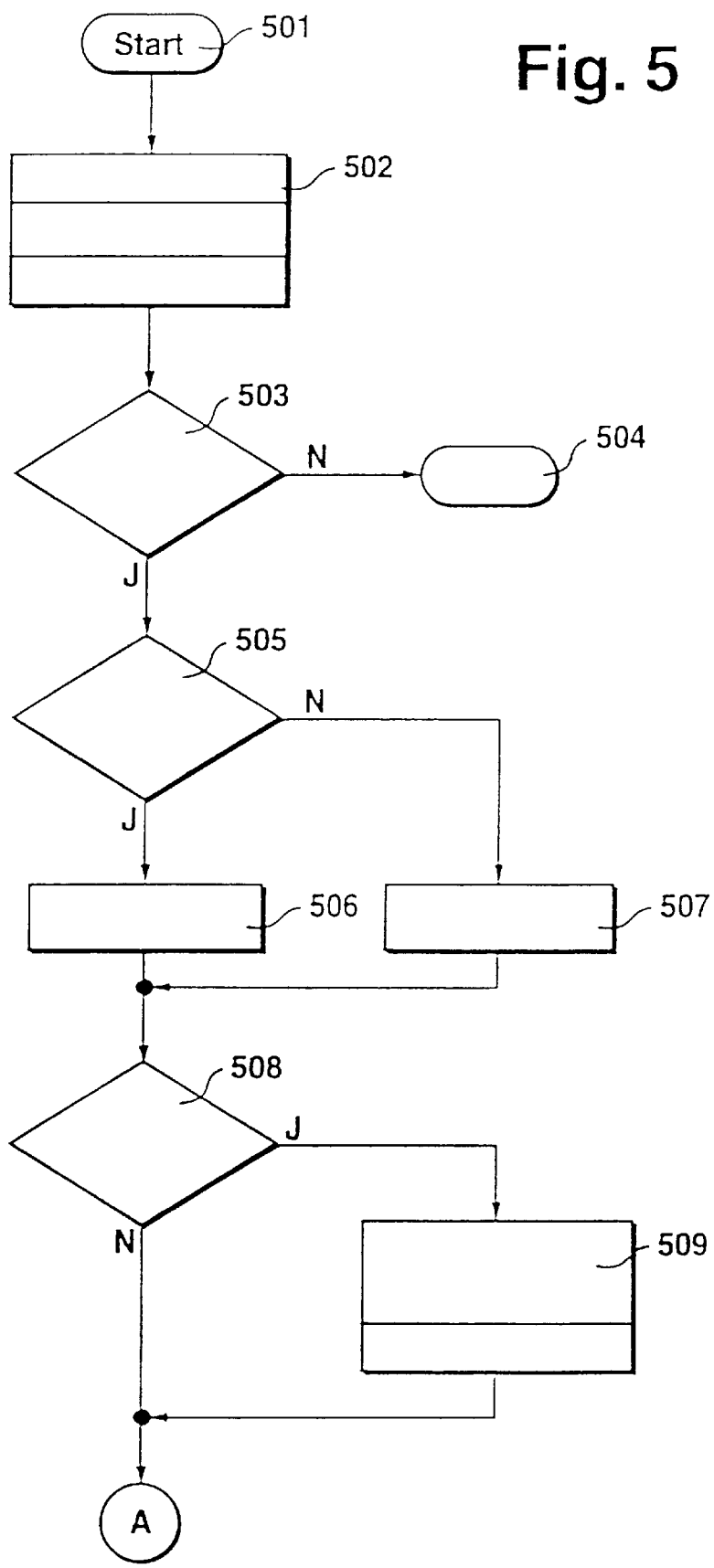
FIG. 5 shows a flow diagram of a function of a first block of the calculation unit according to an embodiment of the present invention.
Figure 5:
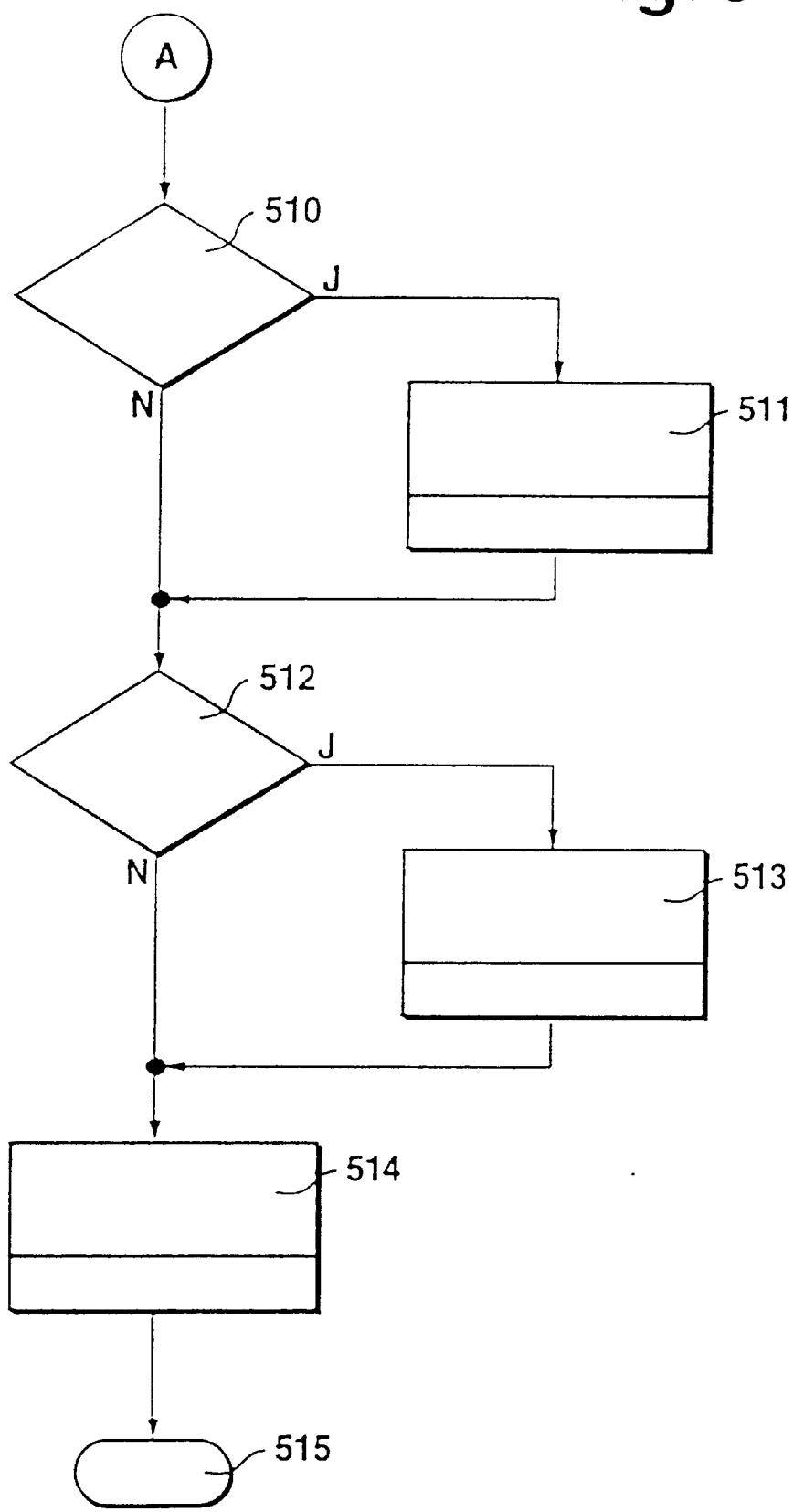

It should be mentioned at this point that the determination in blocks 404*vr* and 406*vr* preferably takes place when, on the one hand, no investigation proceeding from sensor 103*vr* is being made regarding a possible shunt or short circuit to another sensor; and on the other hand, when no investigation proceeding from sensors 103*vl*, 103*hr*, or 103*hl* is being performed regarding a shunt or short circuit to another sensor. In addition, as FIG. 5 shows, the determinations in blocks 404*vr*, 405*vr*, and 406*vr* preferably take place at different times.

For further processing, pulse train DFvr generated in block 201*vr* is conveyed via line 110*a*5, and peak voltage values AMPvr via a line 110*a*6, to control unit 109. In control unit 109, the steps required for appropriate regulation are performed with the aid of these signals.

The following convention is intended to apply in the flow diagrams shown in the following Figures. The states of a signal with which electrical components, for example switches, are actuated are labeled with the designations "high" and "low". The states of the signals which are read out, for example in a calculation unit or in a control unit, are identified by the designations TRUE or FALSE. "Activation" of a block is understood to mean that the operating sequences which take place in the corresponding block are started.

The operating sequences in and function of block 403*vr* will be described on the basis of the flow diagram depicted in FIG. 5. Depiction of the flow diagram for wheel rotation speed sensor 103*vr* is not intended to constitute any restriction. The operating sequences in and function of all blocks 403*ij* are identical. In addition, the combination or division of individual steps constitutes no restriction.

The operating sequence begins with step 501. In the subsequent step 502, pulse train DFvr is read in. On the basis of pulse train DFvr, signal S+Hvr is generated. With this signal, means 309 contained in block 201*vr* is triggered. Also in step 502, signal Zvr is generated by means of the counter. The value of signal Zvr indicates how many teeth of the pulse wheel of wheel rotation speed sensor 103*vr* have passed by the coil since the last initialization of the counter. Following step 502, step 503 is executed.

In step 503, a check is made as to whether the value TRUE is assigned to signal FGAvr. If the value TRUE is assigned to signal FGAvr, step 505 is executed as the next step, and block 403*vr* is enabled, i.e., the operating sequences pending in it are enabled. If, however, the value TRUE is not assigned to signal FGAvr, processing ends with step 504, i.e., block 403*vr* is not enabled.

In step 505, peak voltage values AMPvr are compared with a predefined threshold Aref. As a function of the comparison, a corresponding value is assigned to signal VUvr. If peak voltage value AMPvr is greater than reference value Aref, step 506 is executed next. In this step, the value "high" is assigned to signal VUvr. In the present exemplifying embodiment, this is intended to reduce the gain factor of difference-forming means 307. If, on the other hand, peak voltage value AMPvr is less than reference value Aref, step 507 is executed next after step 505. In this step 507, a value "low" is assigned to signal VUvr. In the present exemplifying embodiment, this is intended to raise the gain of difference-forming means 307. Step 508 is also executed next.

In step 508, a check is made as to whether the value TRUE is assigned to signal FGTvr. If the value TRUE is not assigned to signal FGTvr, step 510 is executed next. If the value TRUE is, however, assigned to signal FGTvr, indicating to block 403*vr* that the envelope analysis occurring in block 404*vr* is enabled, step 509 is performed next. In step 509, first of all the value "high" is assigned to signal TSTvr, as a result of which, in the present exemplifying embodiment, first switching means 303 are intended to be inhibited, i.e., not actuated. Simultaneously in step 509, the value "low" is assigned to signal RDFvr, again causing switchable means 304 to be inhibited, i.e., not actuated. Since both first switching means 303 and switchable means 304 are not being actuated, a voltage is not applied to the first input of wheel rotation speed sensor 103vr, nor is a current established through the latter. Also in step 509, processing in block 404vr is activated. Step 510 is performed next.

In step 510, a check is made as to whether the value TRUE is assigned to signal FGNvr. If the value TRUE is assigned to signal FGNvr—meaning that in the control unit, the investigation as to whether a shunt or short circuit exists between wheel rotation speed sensor 103vr and another wheel rotation speed sensor 103vl, 103hr, or 103hl is enabled—step 511 is performed next. In step 511, first of all the value "low" is assigned to signal TSTvr, so that, in the present exemplifying embodiment, first switching means 303 are actuated. In addition, the value "low" is assigned to signal RDFvr, so that in accordance with step 509, switchable means 304 are not actuated. A voltage is consequently applied to the first terminal of wheel rotation speed sensor 103vr and to the first terminal of coil 103svr. At the same time, in step 511, block 405vr is activated. Step 512 is performed next. If it is determined in step 510 that the value TRUE is not assigned to signal FGNvr, step 512 is executed next.

In step 512, a check is made as to whether the value TRUE is assigned to signal FGOvr. If the value TRUE is assigned to signal FGOvr, control unit 109 causes a value for the resistance of sensor 103vr to be determined from the determined peak voltage values AMPvr, and causes it to be checked. For this purpose, step 513 is executed after step 512. In step 513, the value "low" is assigned to signal TSTvr, causing first switching means 303 to be actuated. At the same time, the value "high" is assigned to signal RDFvr, causing switchable means 304 also to be actuated. Because first switching means 303 and switchable means 304 are actuated, a current is established through sensor 103vr and coil 103svr. Also in step 513, block 406vr is activated; this can, from the peak voltage values AMPvr conveyed to it, determine the value for the resistance of sensor 103vr, and check it accordingly. Step 514 is executed subsequent to step 513.

If it is found in step 512 that the value TRUE is not assigned to signal FGOvr, step 514 is executed next.

In step 514, first of all the value "high" is assigned to signal TSTvr, so that first switching means 303 are not actuated. At the same time, the value "low" is assigned to signal RDFvr, so that switchable means 304 are also not actuated. Because both first switching means 303 and switchable means 304 are not actuated, the potentials present at the terminals of wheel rotation speed sensor 103vr are not influenced. Signals DFvr and AMPvr generated as a function of these potentials can consequently be used for regulation purposes in control unit 109.

Also in step 514, block 405vr is activated. As a result, an investigation can be made as to whether a shunt or short circuit exists between wheel rotation speed sensor 103vr and a line carrying supply voltage or a ground line. Normally this investigation proceeds continuously, provided a request for another investigation is not determined in one of steps 508, 510, or 512. Following step 514, step 515 is executed, thus terminating processing in block 403vr.

Figure 6:
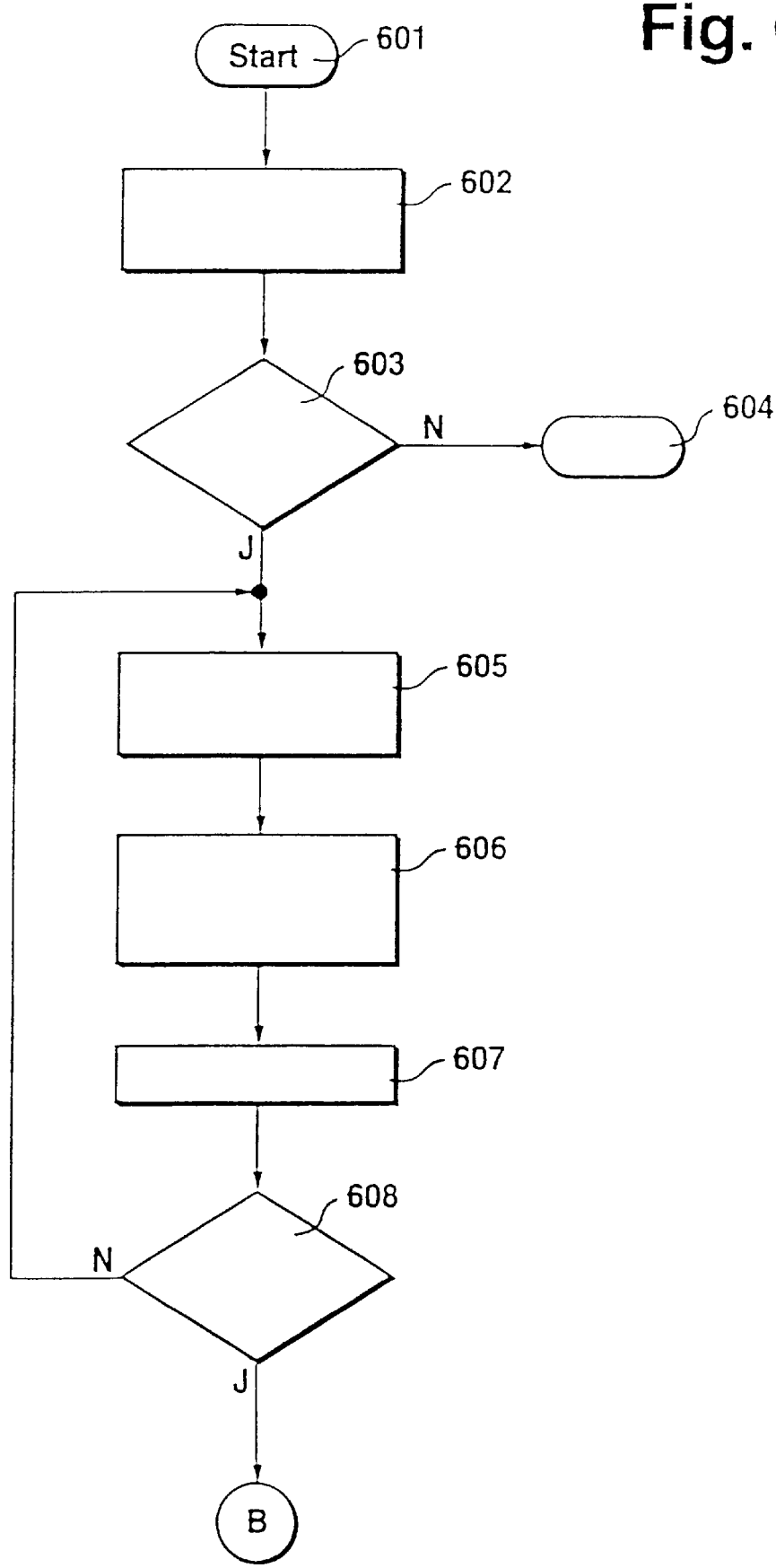
FIG. 6 shows a flow diagram of a function of a second block of the calculation unit according to an embodiment of the present invention.
Figure 6:
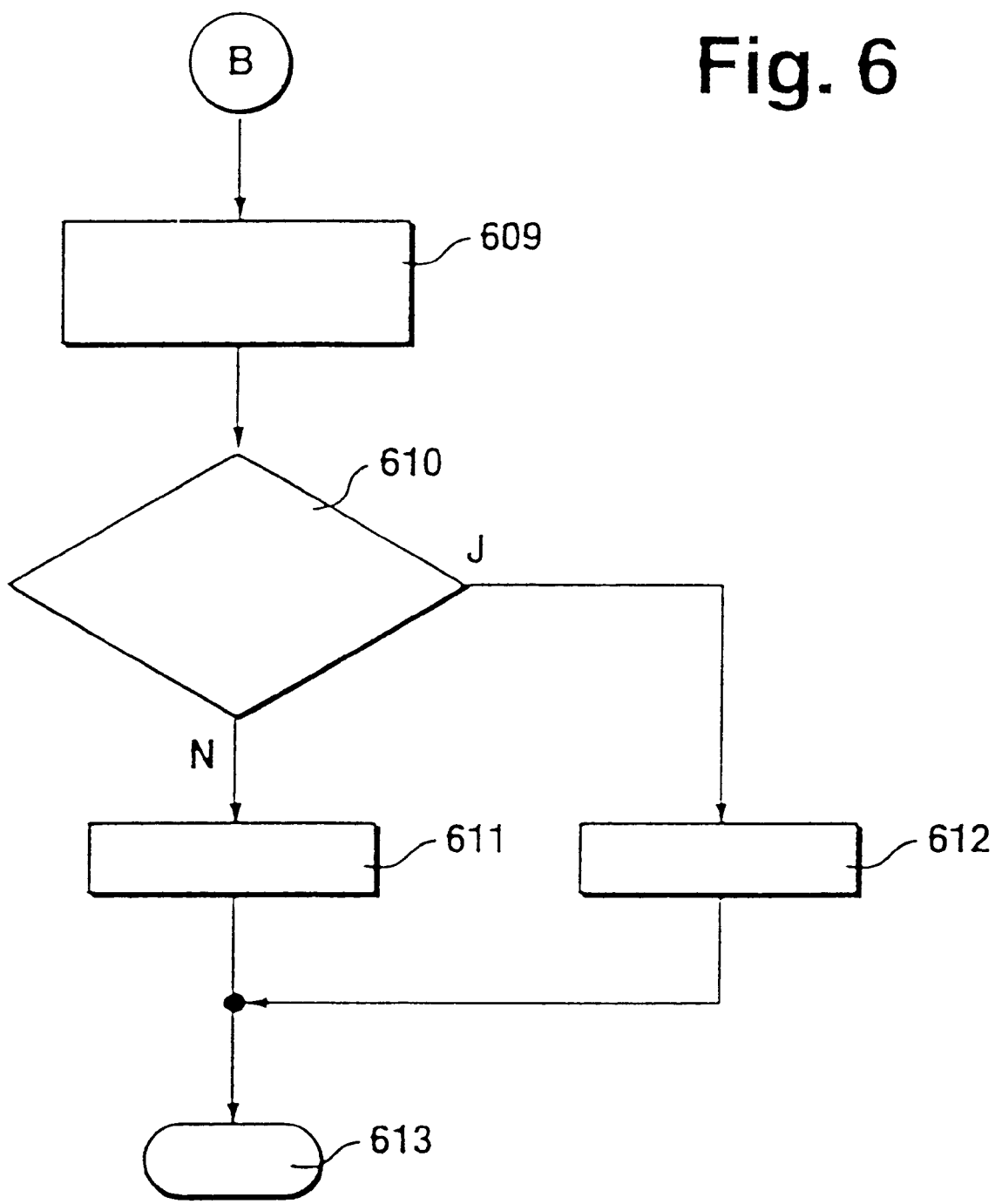

FIG. 6 describes the sequence in block 404vr with reference to a flow diagram. The sequence described for block 404vr can be transferred to the corresponding blocks of wheel rotation speed sensors 103vl, 103hr, and 103hl.

The sequence begins with step 601. Step 602 is executed next. In step 602, the present value of signal Zvr is read in and stored, for example in variable ZSvr. Then step 603 is executed. In step 603, a check is made as to whether the value TRUE is assigned to signal FGTvr. If the value TRUE is not assigned to signal FGTvr, the next step performed is step 604, which terminates processing by block 404vr. If, however, it is found in step 603 that the value TRUE is assigned to signal FGTvr, step 605 is performed as the next step.

It should be noted at this point that steps 605, 606, 607, and 608 constitute a cyclical procedure which is cycled through until the termination criterion in step 608 is met. Because of the cyclical process, values AMPvrmin and AMPvrmax of the previous cycle are available, for example in step 606, for determining the values AMPvrmin and AMPvrmax of the present cycle.

In step 605, signals S+Hvr and AMPvr are read in. Signal S+Hvr is read in because as a result of the triggering of means 309, signal S+Hvr contains information about the point in time at which signal AMPvr changes its value as a result of the sampling taking place in means 309. This information is needed in step 606 so that the value of signal AMPvr can be unequivocally assigned to the pertinent tooth of the pulse wheel.

In the subsequent step 606, the values AMPvrmin and AMPvrmax of the present cycle are determined based on the present value of signal AMPvr determined in step 605, utilizing a suitable comparison algorithm and with consideration given to values AMPvrmin and AMPvrmax of the previous cycle. Subsequent to step 606, step 607 is executed. In step 607, the present value of signal Zvr is read in.

In the subsequent step 608, a determination is made by means of a corresponding query, involving both value ZSvr and the present value of signal Zvr determined in step 607, as to whether the rotor of wheel rotation speed sensor 103vr has completed an entire revolution. For example, the query required in step 608 can be executed in such a way that the difference ZSvr−1 is formed, and this is compared with the present value of signal Zvr. As long as the difference is not identical to the value Zvr, step 605 is again executed on the basis of step 608. If the difference is identical to the value ZSvr, step 609 is executed next.

In step 609, the deviation deltaEvr is determined on the basis of the values AMPvrmin and AMPvrmax identified in step 606. Since the minimum value AMPvrmin and maximum value AMPvrmax of peak voltage values AMPvr were determined in step 606, the magnitude delta Evr represents the deviation of the peak voltage values for one revolution of the pulse wheel.

In the subsequent step 610, a first faulty behavior of sensor 103vr is determined by means of a comparison. The comparison is made up of two test conditions. The first condition checks whether magnitude deltaEvr is greater than a first threshold Eref1. The second condition checks whether the magnitude deltaEvr is less than a second threshold Eref2. If both test conditions are met simultaneously, i.e., if the value deltaEvr lies in the band defined by the first threshold Eref1 and the second threshold Eref2 (Eref1 is less than Eref2), the first faulty behavior of sensor 103vr is not present. The next step executed is therefore step 612, in which the value FALSE is assigned to signal FTvr, indicating that the first faulty behavior of sensor 103vr is not present.

If one of the two test conditions of step 610 is not met, however, the first faulty behavior of sensor 103vr is present.

The next step executed is therefore step 611, in which the value TRUE is assigned to signal FTvr, indicating that the first faulty behavior of sensor 103vr is present.

Both subsequent to step 611 and subsequent to step 612, step 613 is executed next, causing processing in block 404vr to terminate.

The first faulty behavior of the sensor describes a fault of the pulse wheel of wheel rotation speed sensor 103vr. It is thus possible, by analyzing the first faulty behavior, to detect the following faults occurring at wheel rotation speed sensor 103vr: missing or damaged pulse wheel tooth; out-of-round pulse wheel; pulse wheel with vertical runout; pulse wheel with lateral runout; and contamination of the pulse wheel due to metal abrasion.

Figure 7:
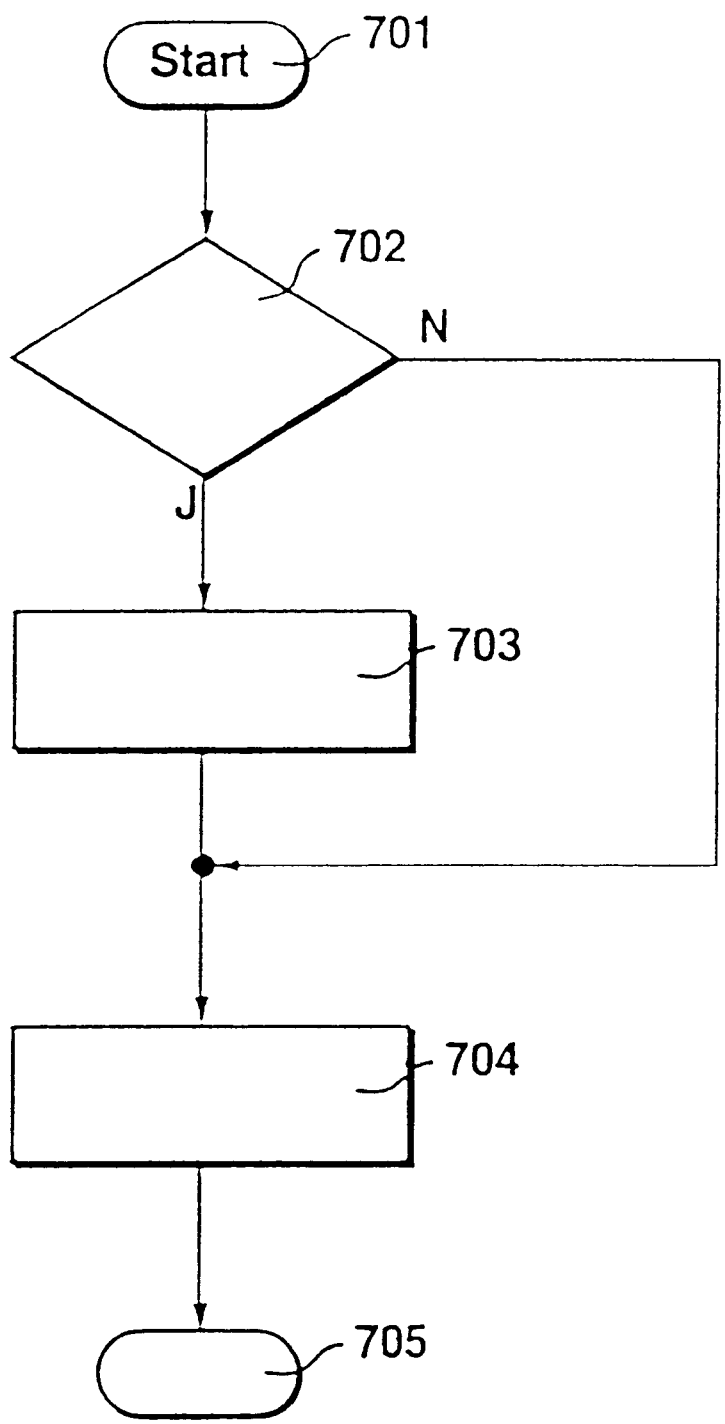
FIG. 7 shows a flow diagram of a function of a third block of the calculation unit according to an embodiment of the present invention.

The function of block 405vr will be described with the aid of the flow diagram depicted in FIG. 7. The sequence begins with step 701. In the subsequent step 702, a check is made as to whether the value TRUE is assigned to signal FGNvr. If the value TRUE is assigned to signal FGNvr, meaning that an investigation is to be made as to whether a shunt exists between wheel rotation speed sensor and, for example, another wheel rotation speed sensor 103vl, 103hr, or 103hl, step 703 is executed next.

In step 703, blocks 405vl, 405hr, and 405hl are activated from control unit 109. For example, the value of signal NEBvl can be analyzed by activation of block 405vl. A determination can consequently be made as to whether a shunt or short circuit exists between wheel rotation speed sensor 103vr and wheel rotation speed sensor 103vl, or between the corresponding connecting lines. Subsequent to step 703, step 704 is executed.

If it is found in step 702 that the value TRUE is not assigned to signal FGNvr, step 704 is executed next. In step 704, the deviation of the value of signal NEBvr from a reference value NEBref is determined, and is assigned to variable NBvr.

Reference value NEBref represents the value which signal NEBvr assumes when, based on wheel rotation speed sensor 103vr, a shunt or short circuit does not exist either to any of the other wheel rotation speed sensors, or to a line carrying supply voltage or to a ground line.

Subsequent to step 704, step 705 is executed; this terminates the processing taking place in block 405vr.

Figure 8:
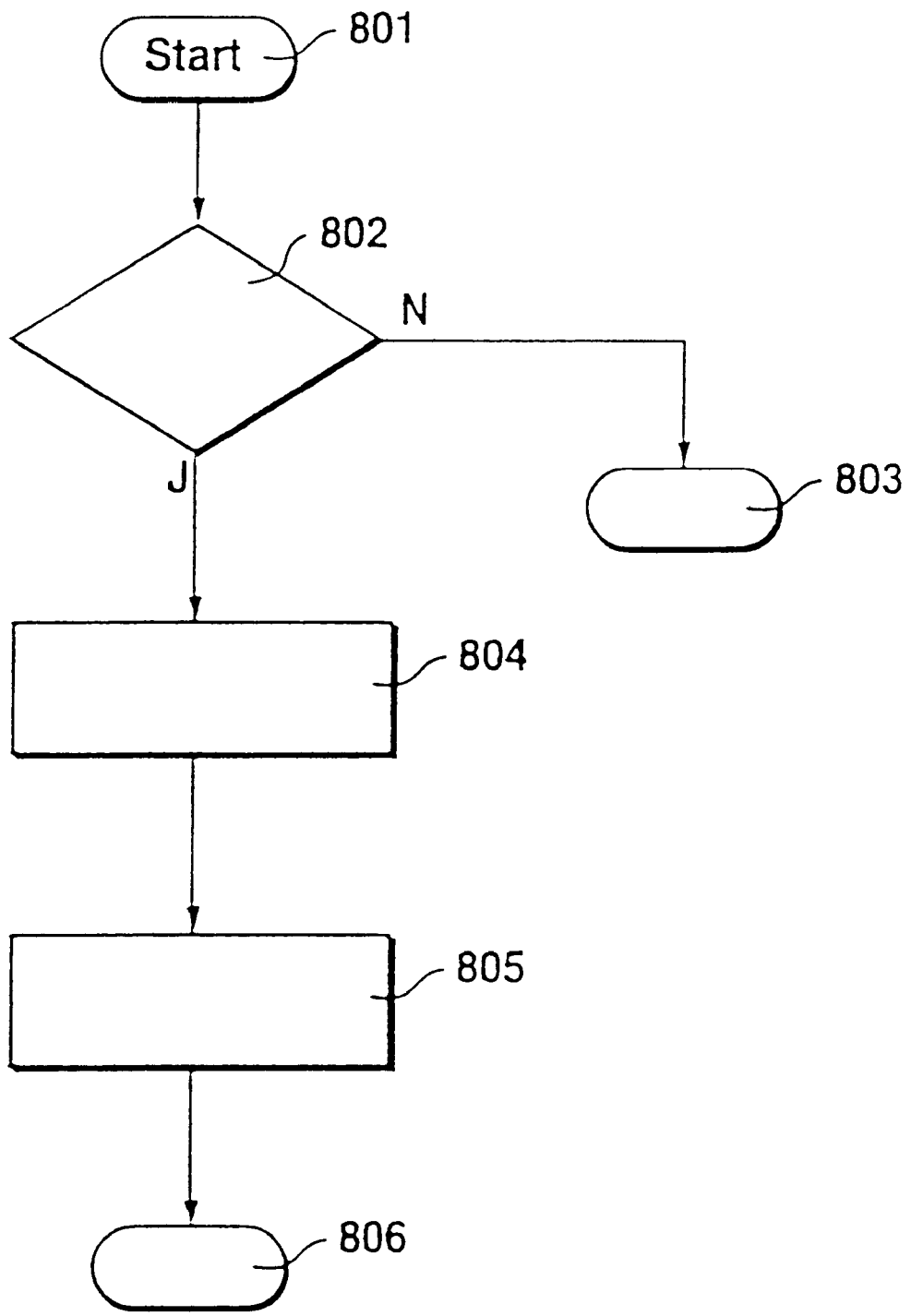
FIG. 8 shows a flow diagram of a function of a fourth block of the calculation unit according to an embodiment of the present invention.

The function of block 406vr will be described with the aid of the flow diagram depicted in FIG. 8. The operating sequence begins with step 801. Subsequent to step 801, step 802 is executed. In step 802, a check is made as to whether signal FGOvr has the value TRUE. If signal FGOvr does not have the value TRUE, step 803 is executed next, terminating processing in block 406vr.

If it is determined in step 802 that signal FGOvr does have the value TRUE, however, step 804 is executed next. In step 804, signals S+Hvr and AMPvr are read in. Signal S+Hvr is read in during step 804 for the same reasons already mentioned for step 605.

In step 805, signal OHMvr is determined on the basis of the signals read in during step 804. The value of this signal is an indication of the resistance of sensor 103vr and of the resistance of coil 103svr. The value of signal OHMvr can, for example, be determined as follows: assuming that, in block 406vr, the value of the current established through sensor 103vr is known, the value of signal OHMvr can be determined, according to Ohm's law, by division based on the value of signal AMPvr. The operating sequence of block 406vr is terminated by step 806 which follows step 805.

Figure 9:
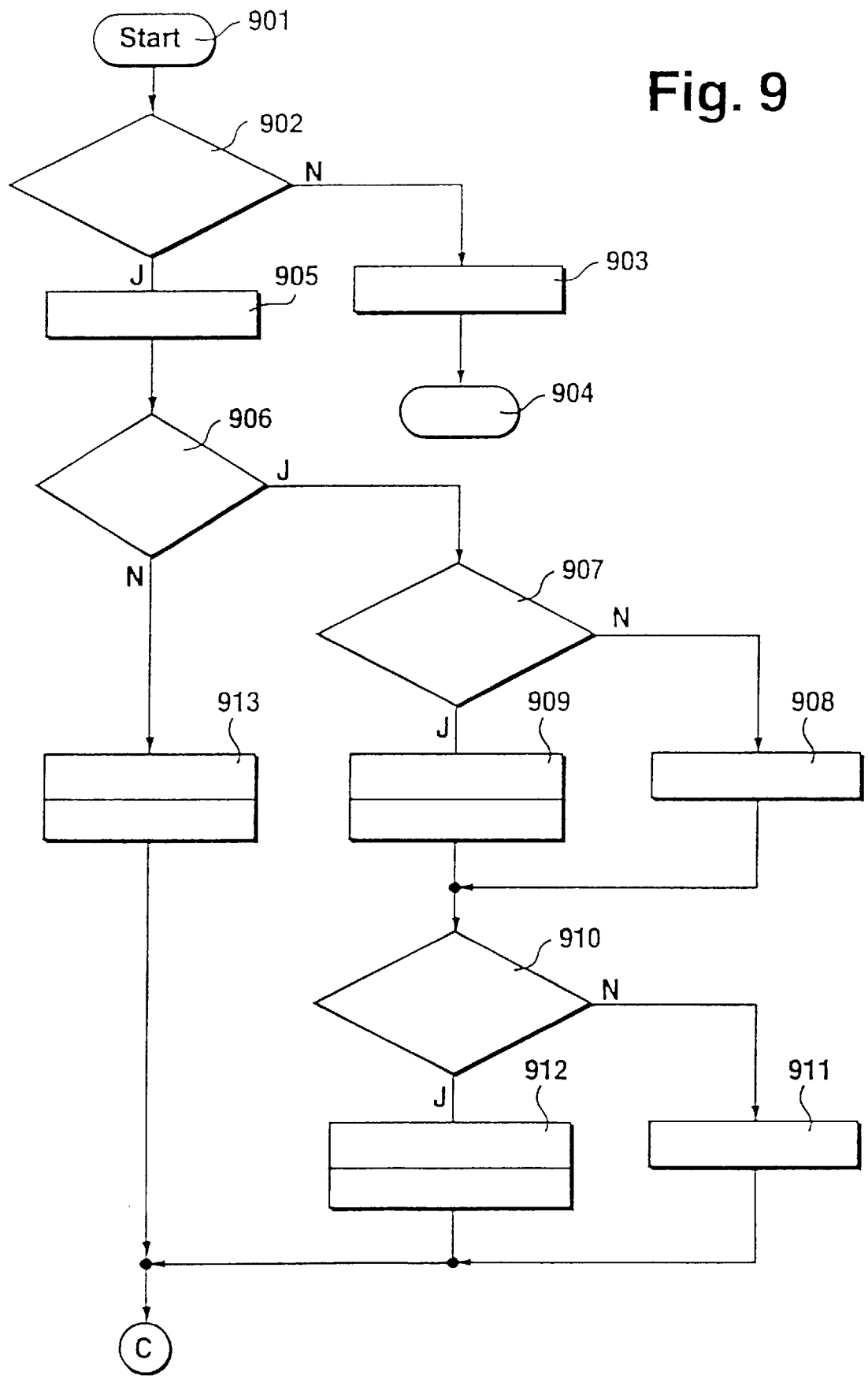
FIG. 9 shows a flow diagram of an exemplary method of the present invention in which a calculation unit is triggered by a control unit.
Figure 9:
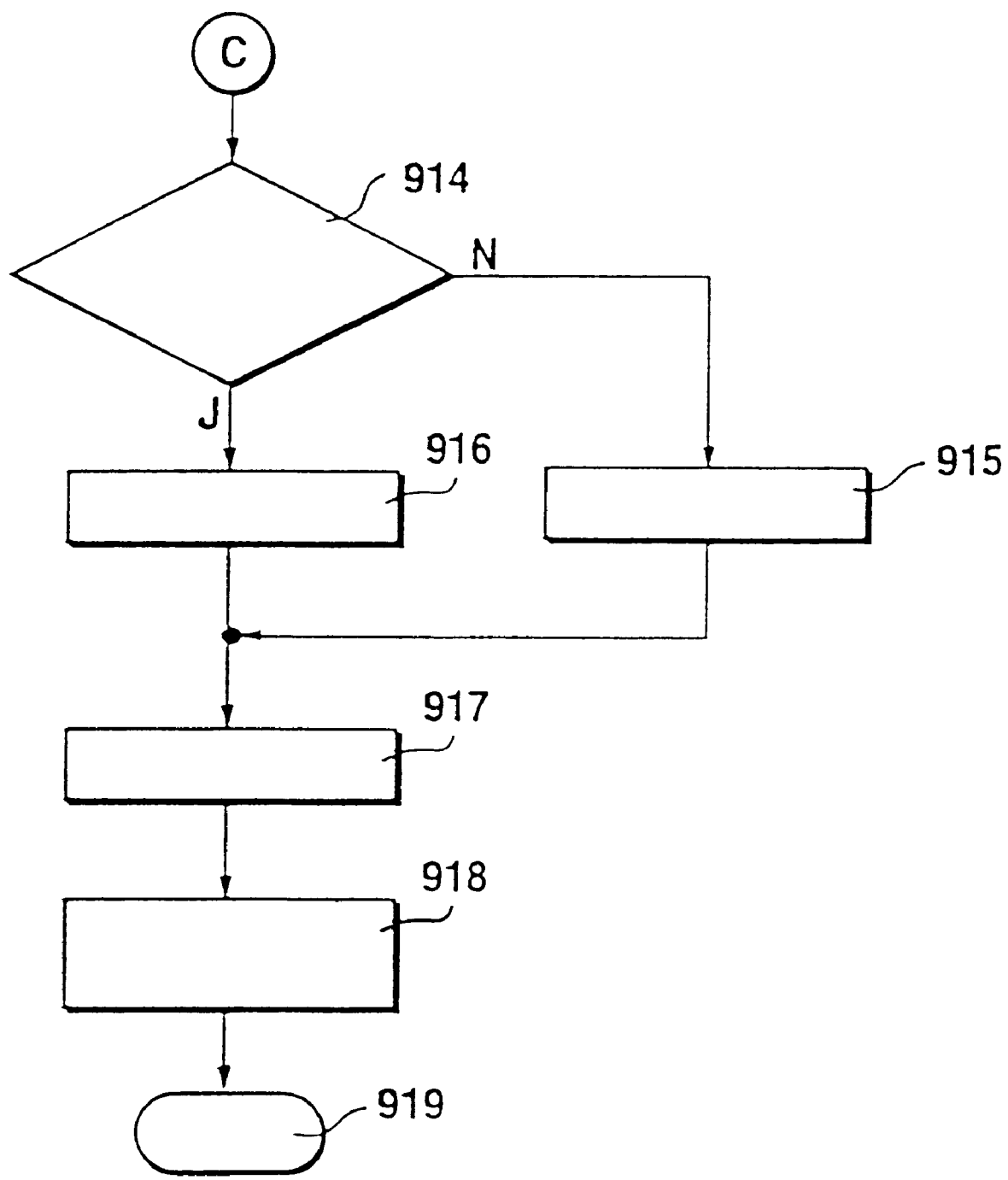

The operating sequences taking place in control unit 109 are described with the aid of the flow diagram depicted in FIG. 9. The operating sequence begins with step 901. In the subsequent step 902, a check is made as to whether the test conditions leading to output of signal FGAvr are met.

Depending on the concept according to which the testing or monitoring of sensor 103vr takes place, the following are possible as test conditions. If the testing or monitoring of sensor 103vr proceeds continuously in control unit 109 in the background, the testing or monitoring is enabled at certain time intervals or in a certain temporal pattern. The query as to whether the temporal pattern is being met can be used here as the test condition. If, on the other hand, testing or monitoring of sensor 103vr is requested at an arbitrary point in time, for example by control unit 109 or by another control unit operating in parallel or by a higher-level control unit, a useful test condition here is the determination as to whether such a request is present.

If it is found in step 902 that the test conditions for signal FGAvr are not met, step 903, in which the value FALSE is assigned to signal FGAvr, is executed next. This completely inhibits testing or monitoring of sensor 103vr. Subsequent to step 903, the operating sequence is terminated with step 904.

If, on the other hand, it is found in step 902 that the test conditions for signal FGAvr are met, step 905 is executed next. In this step, the value TRUE is assigned to signal FGAvr. With this assignment, testing and monitoring of sensor 103vr is generally enabled.

In the subsequent step 906, a determination is made as to whether the value TRUE is assigned to signal vt. If the query in step 906 determines that the value TRUE is not assigned to signal vt, in the subsequent step 913 first of all the value FALSE is assigned to signal FGTvr, so that the envelope analysis taking place in block 404vr is not enabled. Also in step 913, the value FALSE is assigned to the signal FGOvr, so that the determination of the resistance of sensor 103vr taking place in block 406vr is not enabled. Subsequent to step 913, step 914 is executed.

If, however, it is determined in step 906 that the value TRUE is assigned to signal vt, step 907 is executed next. Step 907 tests whether the test conditions for signal FGTvr are met, i.e., whether the envelope analysis of sensor 103vr taking place in block 404vr is enabled. The statements made for step 902 apply to the test conditions for signal FGTvr.

If it is found in step 907 that the test conditions for signal FGTvr are not met, step 908, in which the value FALSE is assigned to signal FGTvr, is executed next. As a result, the envelope analysis of sensor 103vr taking place in block 404vr is not enabled. Subsequent to step 908, step 910 is executed.

If, however, it is found in step 907 that the test conditions for signal FGTvr are met, step 909 is executed next. In step 909, the value TRUE is assigned to signal FGTvr, causing the envelope analysis of sensor 103vr which takes place in block 404vr to be enabled. Also in step 909, signal FTvr generated in block 404vr is analyzed.

Actions are taken in control unit 109 as a function of the analysis of signal FTvr. If signal FTvr has the value TRUE, meaning that a first faulty behavior of sensor 103vr is present, then, for example, processing in control unit 109 of the signals generated by sensor 103vr can be discontinued. If signal FTvr has the value FALSE, the first faulty behavior is not present with regard to sensor 103vr. Processing of the algorithm implemented in control unit 109 can be pursued without restriction.

Step 909 is followed by step 910, in which a determination is made as to whether the test conditions for signal FGOvr are met. The statements already made for step 902 apply to the test conditions. If it is found in step 910 that the test conditions are not met, step 911 is then executed next. In step 911, the value FALSE is assigned to signal FGOvr. As a result, the determination of the resistance of sensor 103vr taking place in block 406vr is not enabled. Subsequent to step 911, step 914 is executed.

If, however, it is found in step 910 that the test conditions for signal FGOvr are met, step 912 is executed next. In step 912, first of all the value TRUE is assigned to signal FGOvr, thus enabling the determination of the resistance of sensor 103vr taking place in block 406vr. Also in step 912, signal OHMvr is analyzed. Analysis of signal OHMvr can, for example, proceed in such a way that the value of signal OHMvr is compared with a third and a fourth threshold. In this context, the third and fourth threshold are intended to form a band for the value of the resistance of sensor 103vr. If the value of signal OHMvr lies within that band, no faulty behavior exists for sensor 103vr with regard to its resistance value. If, on the other hand, the value of signal OHMvr lies outside that band, it can then be assumed that a faulty behavior exists for sensor 103vr with regard to its resistance value. In that case, processing in control unit 109 of the signals generated by sensor 103vr can, for example, be discontinued.

Subsequent to step 912, step 914 is executed. In step 914 a determination is made as to whether the test conditions for signal FGNvr are met. The statements already made for step 902 apply to the test conditions. If it is determined in step 914 that the test conditions are not met, step 915 is executed next. In step 915, the value FALSE is assigned to signal FGNvr. As a result, the investigation occurring in block 405vr, as to whether a shunt or short circuit exists between wheel rotation speed sensor 103vr and another wheel rotation speed sensor 103vl, 103hr, or 103hl, is not enabled. Subsequent to step 915, step 917 is executed.

If, however, it is found in step 914 that the test conditions for signal FGNvr are met, step 916, in which the value TRUE is assigned to signal FGNvr, is executed next. This enables the investigation which takes place in block 405vr. Subsequent to step 916, step 917 is performed.

In step 917, signal NBvr is analyzed. After step 917, step 918, in which signal AMPvr and signal DFvr are processed, is performed. Processing of these two signals takes place in the context of the control algorithm implemented in control unit 109. Step 919, which terminates processing, is executed next.

Figure 10:
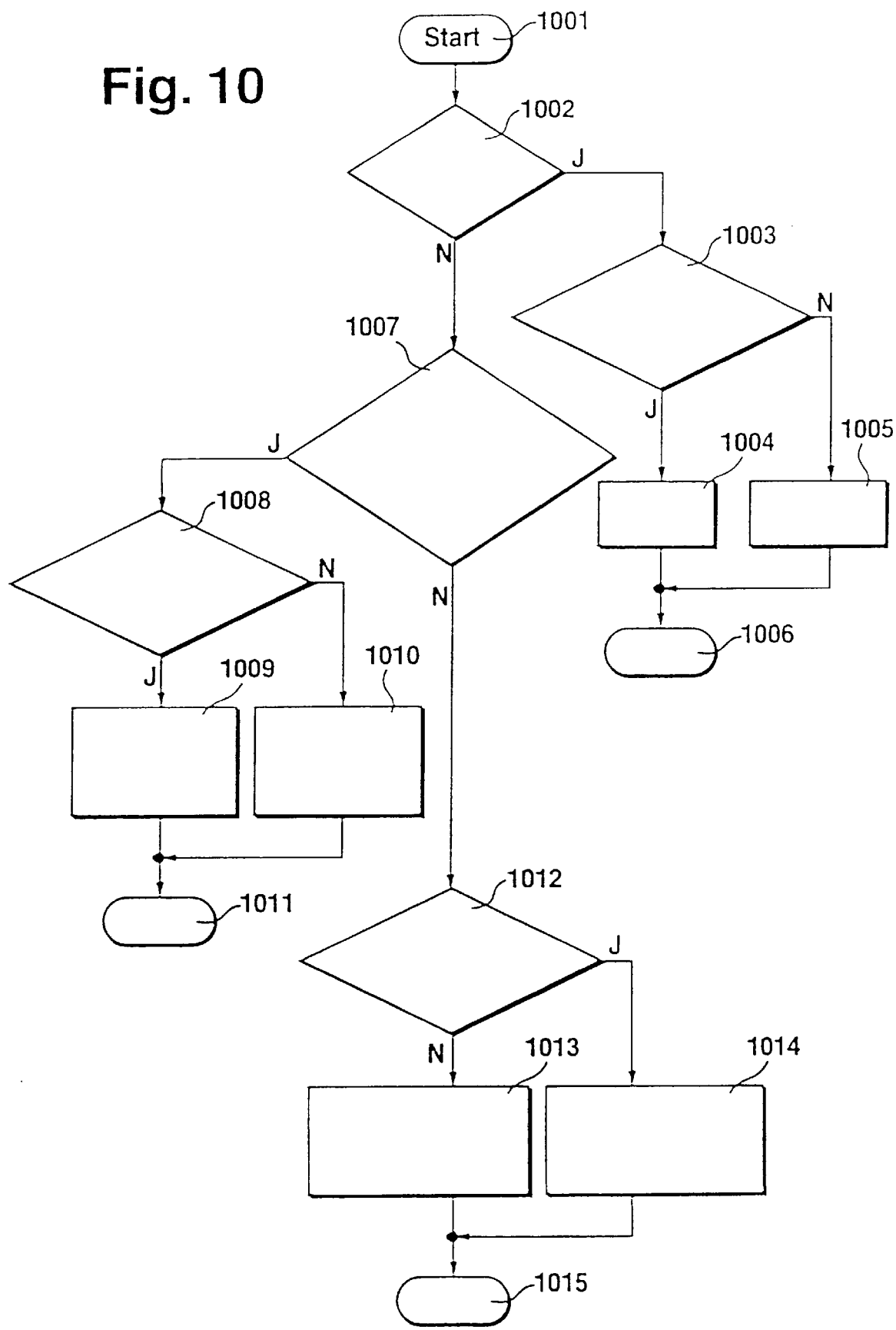
FIG. 10 shows a flow diagram of an exemplary method of the present invention in which a control unit analyzes signals generated by a calculation unit.

The analysis of signal NBvr taking place in step 917 will be described with the aid of the flow diagram depicted in FIG. 10. The analysis of signal NBvr begins with step 1001. Following this step, step 1002 is executed.

In step 1002, a check is made as to whether the value TRUE is assigned to signal FGNvr. If the value TRUE is assigned to signal FGNvr, this means that a voltage has been applied to the first terminal of sensor 103vr. A change in the signal NEBvr generated by means of the voltage divider, which includes components 311 and 312, can therefore be expected.

For this purpose signal NBvr, which was determined in step 704 on the basis of signal NEBvr, is analyzed in the subsequent step 1003.

In step 1003, a check is made as to whether the value of signal NBvr is greater than threshold value NBref1, and whether the value of signal NBvr is less than threshold value NBref2 (NBref1 is less than NBref2); i.e., as the test condition, a check is made as to whether the value of signal NBvr lies between these two threshold values. Threshold values NBref1 and NBref2 are selected so that the value of signal NBvr lies in the band described by the two threshold values if the potentials present at the terminals of wheel rotation speed sensor 103vr are not being influenced.

If the test condition in step 1003 is met, this is an indication that there has been no change regarding signal NEBvr, which suggests that the channel which serves to analyze sensor 103vr is defective. The operating sequence is therefore continued with step 1004. In this step, the information that the channel associated with wheel rotation speed sensor 103vr is defective is transmitted to control unit 109. Step 1006 is then executed.

If, however, the test condition in step 1003 is not met—which suggests that the channel which serves to analyze sensor 103vr appears to be in good order—step 1005 is executed next. In this step, control unit 109 is informed that the channel associated with wheel rotation speed sensor 103vr is in good order. Step 1006, which terminates the program sequence, is then executed.

If it is determined in step 1002 that signal FGNvr did not have the value TRUE, step 1007 is then executed next. In this step, a check is made as to whether a voltage has been applied to the first terminal of another wheel rotation speed sensor. To this end, a check is made as to whether signal FGNvl, signal FGNhl, or signal FGNhr has assumed the value TRUE.

If it is determined by means of this query that one of the three signals has assumed the value TRUE, step 1008 is executed next. The check which takes place in step 1008 is the same as in step 1003.

If the test condition of step 1008 is met, this indicates that signal NEBvr has not been influenced by the application of a voltage to the first terminal of one of the other wheel rotation speed sensors 103vl, 103hr, or 103hl. The program therefore transitions to step 1009, in which control unit 109 is informed that no shunt or short circuit to another channel is present. After step 1009, step 1011 is executed.

If, however, the test condition in step 1008 is not met, which indicates that signal NEBvr has been influenced, meaning that a shunt or short circuit to another channel exists, step 1010 is then executed next. In this step, control unit 109 is informed that a shunt or short circuit to another channel exists. Step 1011, which terminates the sequence, is then executed.

If the test condition contained in step 1007 is not met, a voltage was not applied to the first input of any sensor 103ij. Step 1012 is executed next. The query taking place in step 1012 is the same as in steps 1003 and 1008.

If the test condition contained in step 1012 is not met, which means that an influence on signal NEBvr is present, the control unit is then informed in the subsequent step 1013 that a shunt or short circuit exists between sensor 103vr and a line carrying supply voltage or a ground line. Subsequent to step 1013, step 1015 is executed.

If, on the other hand, the test condition contained in step 1012 is met, which indicates that no influence on signal NEBvr is present, the control unit is then informed in the subsequent step 1014 that no shunt or short circuit exists between sensor 103vr and any ground line or line carrying supply voltage. Step 1015, which terminates processing, is executed subsequent to step 1014.

Figure 11:
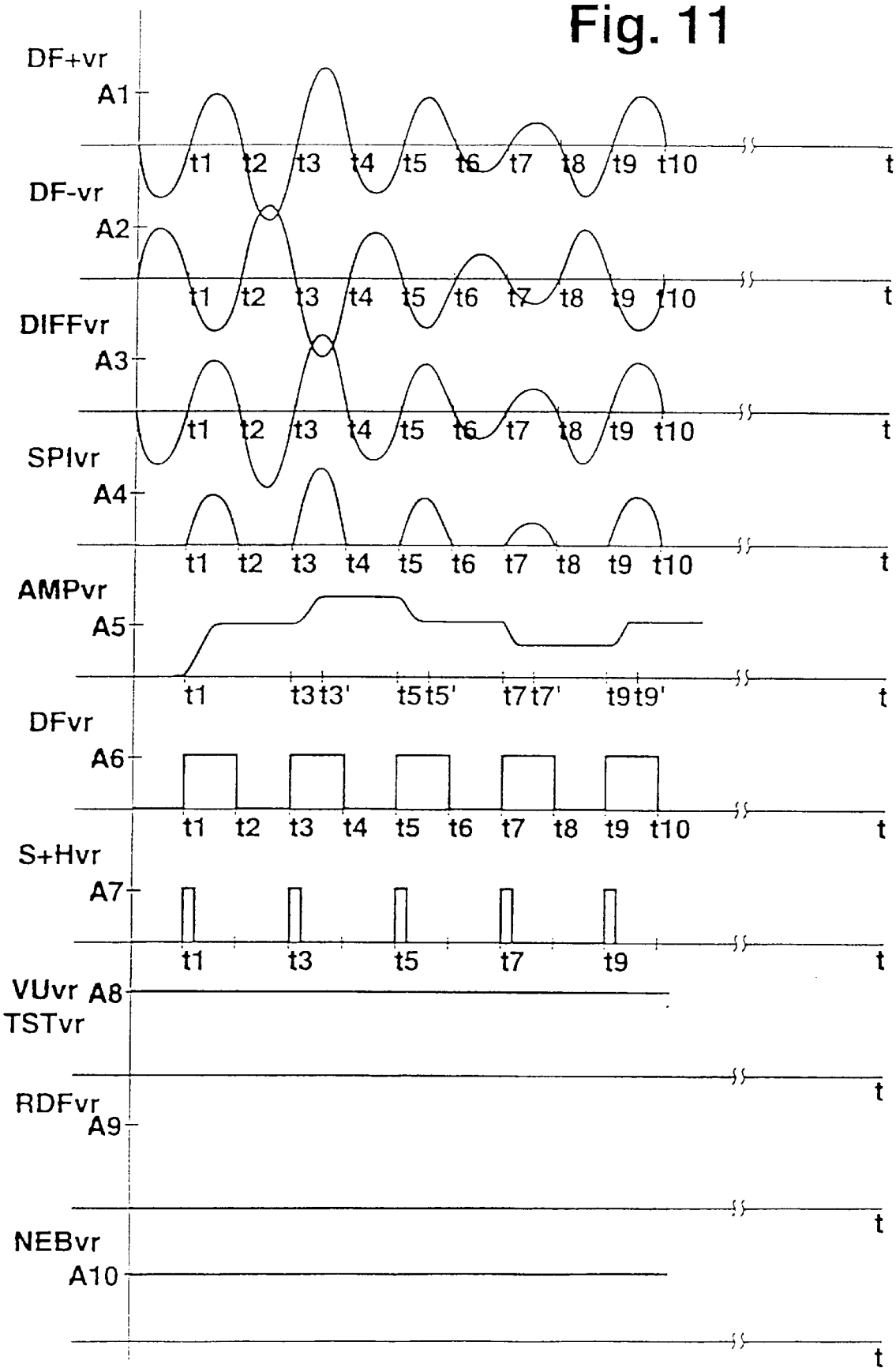
FIG. 11 shows a series of a time diagrams depicting the signals generated by a sensor, the signals generated with the aid of analysis means according to an embodiment of the present invention and conveyed to a calculation unit according to an embodiment of the present invention, and the signals generated by a calculation unit according to an embodiment of the present invention and conveyed to analysis means according to an embodiment of the present invention.

FIG. 11 depicts the time diagrams for the signals that are conveyed to block 201vr as input signals, output from block 201vr as output signals, or processed internally in block 201vr. These time diagrams are intended, among other purposes, to improve understanding of the operations occurring in block 201vr.

Signals DF+vr and DF−vr represent the potentials occurring at the terminals of sensor 103vr or at the terminals of coil 103svr. As is evident from these two time diagrams, amplitude fluctuations can occur in these signals. These fluctuations can be caused, for example, by a vertical runout or lateral runout of the pulse wheel of sensor 103vr. Signal DIFFvr is the output signal of difference-forming means 307. The amplitude fluctuations contained in signals DF+vr and DF−vr are also contained in that signal.

Signal SPIvr is generated on the basis of signal DIFFvr, with the aid of means 308, to determine peak voltage values. In the present exemplifying embodiment, signal SPIvr is intended to contain only the positive portions of signal DIFFvr. Signal AMPvr is formed on the basis of SPIvr, with the aid of means 309, to store the peak voltage values. The profile of signal AMPvr shows, as a function of signal S+Hvr, a rise in signal AMPvr up to the respective peak voltage value of signal SPIvr. Signal S+Hvr controls the transfer by signal AMPvr of the peak voltage value occurring in signal SPIvr.

Signal DFvr represents a pulse train that is obtained with the aid of comparison means 210 from signals DF+vr and DF−vr and thus has the same frequency. Based on signal DFvr, signal S+Hvr is generated, for example, by the fact that a pulse for signal S+Hvr is generated at a rising edge of signal DFvr.

The signals depicted in the time diagrams are intended to be received when block 201vr is in a state during which first switching means 303 and switchable means 304 of block 201 have not been actuated. This is illustrated by constant profiles for signals TSTvr and RDFvr with the corresponding values. The profile of signal VUvr indicates that difference-forming means 307 is not being influenced. At the same time, the first switching means and switchable means in the other blocks 201vl, 201hl, and 201hr also should not be actuated. The constant profile of signal NEBvr illustrates that no changes have been made to blocks 102vr, 201vl, 201hl, or 201hr.

Figure 12:
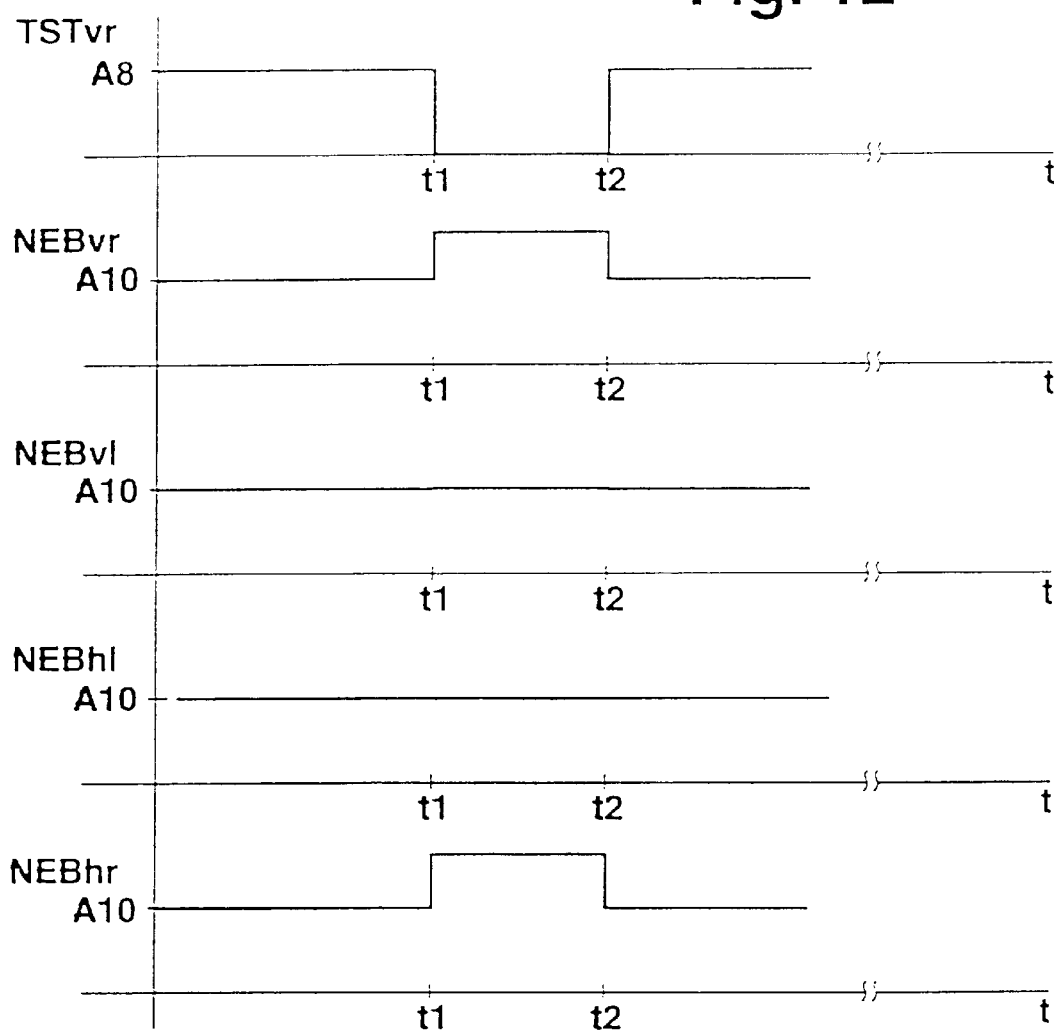
FIG. 12 shows a time diagram with selected signals such as may occur during the investigation with regard to a shunt between various sensors according to the present invention.

The time diagrams depicted in FIG. 12 are intended to describe the situation which is present, for example, when a shunt or short circuit exists between sensor 103vr and sensor 103hr. During the time period between times t1 and t2, first switching means 303 of block 201vr are actuated. For this reason, an influence on signal NEBvr occurs in the same time period. No shunt or short circuit is meant to exist between sensor 103vr and sensors 103vl or 103hl. This is indicated by the constant profiles of signals NEBvl and NEBhl. A shunt or short circuit is meant to exist between sensor 103vr and sensor 103hr. An influence on signal NEBhr therefore occurs in the time period described above.

Figure 13:
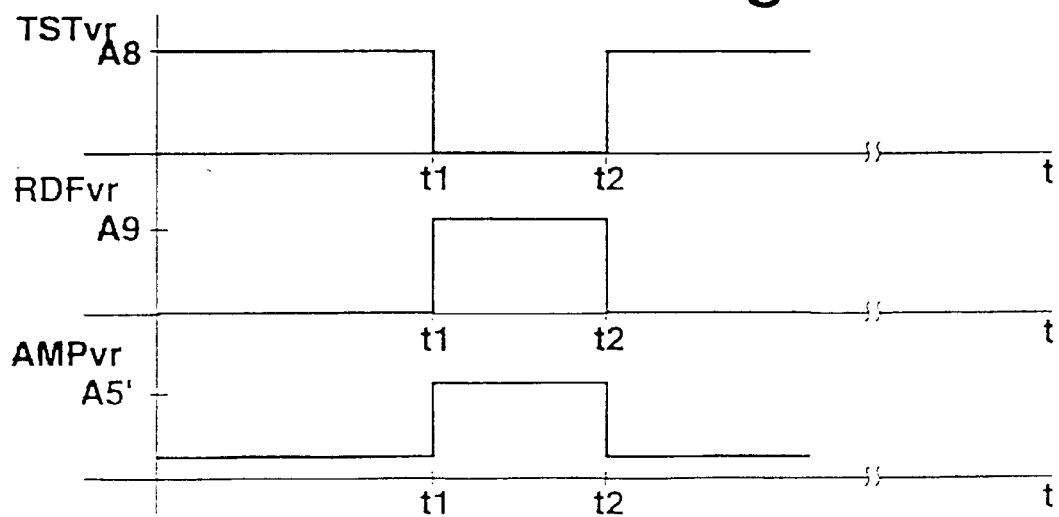
FIG. 13 shows a time diagram depicting signals that are important for determining the resistance of the sensor.

The influence on signal AMPvr that occurs during the resistance measurement at sensor 103vr is depicted by means of the time diagrams in FIG. 13. The resistance measurement is to take place during the time period described by times t1 and t2. For this purpose, first switching means 303 is correspondingly triggered with the aid of signal TSTvr. Switchable means 304 is also correspondingly triggered with the aid of signal RDFvr. Because a current is established through sensor 103vr and through coil 103svr, the level of signal AMPvr is increased during the time period described above. The resistance value of sensor 103vr can be determined on the basis of this modified level.

What is claimed is:

1. An apparatus for monitoring at least one sensor having at least two terminals, comprising:

first switching means connected to a first terminal of the at least one sensor, the first switching means selectively applying a voltage to the first terminal;

switchable means connected to a second terminal of the at least one sensor, the switchable means selectively establishing a current through the at least one sensor, the switchable means including a second switching means and a current source; and analysis means connected to each of the terminals of the at least one sensor for analyzing potentials occurring at the terminals of the at least one sensor;

wherein the first switching means and the switchable means can be independently actuated.

2. The apparatus according to claim 1, wherein the voltage is applied to the first terminal of the at least one sensor by actuation of the first switching means; and the current is established through the at least one sensor by actuation of the first switching means and the switchable means.

3. The apparatus according to claim 1, wherein the analysis means includes a first circuit group and a second circuit group, each of the circuit groups being connected to the first and second terminals of the at least one sensor.

4. The apparatus according to claim 3, wherein the analysis means further comprises a calculation unit, the calculation unit processing signals generated by the first and second circuit groups and actuating the first switching means and the switchable means.

5. The apparatus according to claim 4, wherein the calculation unit includes a microprocessor.

6. The apparatus according to claim 4, wherein the first circuit group includes:

difference-forming means connected to the first and second terminals of the at least one sensor;

means for determining peak voltage values connected downstream of the difference-forming means; and means for storing the peak voltage values connected downstream of the means for determining peak voltage values; and wherein the first circuit group determines peak voltage values as a function of potentials occurring at the terminals of the at least one sensor and conveys the peak voltage values to the calculation unit.

7. The apparatus according to claim 6, wherein the difference-forming means includes a subtracting amplifier having an adjustable gain factor, the gain factor being adjustable at least as a function of the peak voltage values.

8. The apparatus according to claim 6, wherein the calculation unit includes means for detecting a first faulty behavior of the at least one sensor by comparing the peak voltage values with a first threshold and a second threshold, the means for detecting the first faulty behavior being active when the first switching means and the switchable means are not actuated.

9. The apparatus according to claim 8, wherein the calculation unit includes means for comparing a magnitude describing a vehicle behavior with a fifth threshold and a sixth threshold; and detection of the first faulty behavior of the at least one sensor is performed when the magnitude describing the vehicle behavior is between the fifth threshold and sixth threshold.

10. The apparatus according to claim 6, wherein
the calculation unit includes means for determining a resistance of the at least one sensor using the peak voltage values and checking the resistance of the at least one sensor by comparing the resistance with a third threshold and a fourth threshold, the means for determining and checking the resistance of the at least one sensor being active when the first switching means and the switchable means are actuated.

11. The apparatus according to claim 10, wherein the calculation unit includes means for comparing a magnitude describing a vehicle behavior with a fifth threshold and a sixth threshold; and
at least one determination and checking of the resistance value is performed when the magnitude describing the vehicle behavior is between the fifth threshold and the sixth threshold.

12. The apparatus according to claim 4, wherein
the second circuit group includes a comparison means, the comparison means determining a pulse train as a function of the potentials occurring at the terminals of the at least one sensor, the pulse train being conveyed to the calculation unit.

13. The apparatus according to claim 6, wherein
the second circuit group includes a comparison means, the comparison means determining a pulse train as a function of the potentials occurring at the terminals of the at least one sensor, the pulse train being conveyed to the calculation unit; and
the calculation unit includes means for generating, based at least on the pulse train, signals for triggering the means for storing the peak voltage values.

14. The apparatus according to claim 4, further comprising:
a voltage divider connected to the first and second terminals of the at least one sensor, the voltage divider generating at least one divider signal dependent on potentials occurring at the terminals of the at least one sensor, the divider signal being provided to the calculation unit.

15. The apparatus according to claim 14, wherein
the calculation unit includes means for determining, as a function of the divider signal when the first switching means and the switchable means are not actuated, whether a shunt exists between the at least one sensor and one of a ground line and a line carrying a supply voltage.

16. The apparatus according to claim 14, further comprising
a first sensor and a second sensor, the second sensor being attached to a second voltage divider, the second voltage divider producing a second divider signal; and
wherein the calculation unit includes means for determining, based on the second divider signal and the voltage applied to the first terminal of the first sensor, whether a shunt exists between the first sensor and the second sensor, the means for determining whether a shunt exists between the first sensor and the second sensor being active when the first switching means connected to the first sensor is actuated and the switchable means connected to the first sensor is not actuated.

17. The apparatus according to claim 1, wherein
the at least one sensor is an inductive sensor for detecting wheel rotation speed as a part of an antilock braking regulating circuit.

18. A method for monitoring at least one sensor, the at least one sensor having at least two terminals, comprising the steps of:
applying a voltage to a first terminal of the at least one sensor by actuation of a first switching means;
establishing a current through the at least one sensor by actuation of the first switching means and actuation of a switchable means;
determining at least peak voltage values via an analysis circuit using signals generated by the at least one sensor;
conveying the peak voltage values to a calculation unit;
generating a divider signal via a voltage divider using the signals generated by the at least one sensor;
conveying the divider signal to the calculation unit; and
performing at least one of:
(a) determining a resistance of the at least one sensor using the peak voltage values when the first switching means and the switchable means are actuated; and
(b) checking the resistance of the at least one sensor in the calculation unit; and
(c) identifying a first faulty behavior of the at least one sensor using the peak voltage values when the first switching means and the switchable means are not actuated; and
(d) determining, using the divider signal, whether a shunt exists between the at least one sensor and one of a ground line and a line carrying a supply voltage when the first switching means and the switchable means are not actuated; and
(e) determining whether a shunt exists between the at least one sensor and a further sensor, using a signal generated by a second voltage divider connected to the further sensor, when the first switching means of the at least one sensor is actuated and the switchable means of the at least one sensor is not actuated.

19. A method for monitoring at least one sensor, the at least one sensor having at least two terminals, comprising the steps of:
applying a voltage to a first terminal of the at least one sensor by actuation of a first switching means;
establishing a current through the at least one sensor by actuation of the first switching means and actuation of a switchable means;
determining at least peak voltage values via an analysis circuit using signals generated by the at least one sensor;
conveying the peak voltage values to a calculation unit;
generating a divider signal via a voltage divider using the signals generated by the at least one sensor;
conveying the divider signal to the calculation unit;
determining a resistance of the at least one sensor using the peak voltage values when the first switching means and the switchable means are actuated;
checking the resistance of the at least one sensor in the calculation unit; and
identifying a first faulty behavior of the at least one sensor using the peak voltage values when the first switching means and the switchable means are not actuated.

20. A method for monitoring at least one sensor, the sensor having at least two terminals, comprising the steps of:
applying a voltage to a first terminal of the at least one sensor by actuation of a first switching means;

establishing a current through the at least one sensor by actuation of the first switching means and actuation of a switchable means;

determining at least peak voltage values via an analysis circuit using signals generated by the at least one sensor;

conveying the peak voltage values to a calculation unit;

generating a divider signal via a voltage divider using the signals generated by the at least one sensor;

conveying the divider signal to the calculation unit;

determining a resistance of the at least one sensor using the peak voltage values when the first switching means and the switchable means are actuated;

checking the resistance of the at least one sensor in the calculation unit; and determining, using the divider signal, whether a shunt exists between the at least one sensor and one of a ground line and a line carrying a supply voltage when the first switching means and the switchable means are not actuated.

21. A method for monitoring at least one sensor, the at least one sensor having at least two terminals, comprising the steps of:

applying a voltage to a first terminal of the at least one sensor by actuation of a first switching means;

establishing a current through the at least one sensor by actuation of the first switching means and actuation of a switchable means;

determining at least peak voltage values via an analysis circuit using signals generated by the at least one sensor;

conveying the peak voltage values to a calculation unit;

generating a divider signal via a voltage divider using the signals generated by the at least one sensor;

conveying the divider signal to the calculation unit;

determining a resistance of the at least one sensor using the peak voltage values when the first switching means and the switchable means are actuated;

checking the resistance of the at least one sensor in the calculation unit; and determining whether a shunt exists between the at least one sensor and a further sensor, using a signal generated by a second voltage divider connected to the further sensor, when the first switching means of the at least one sensor is actuated and the switchable means of the at least one sensor is not actuated.

22. A method for monitoring at least one sensor, the at least one sensor having two terminals, comprising the steps of:

applying a voltage to a first terminal of the at least one sensor using a first switching means connected to the first terminal of the at least one sensor;

analyzing potentials occurring at the terminals of the at least one sensor using analysis means connected to the terminals of the at least one sensor; and establishing a current through the at least one sensor using a switchable means connected to the second terminal of the at least one sensor;

wherein the switchable means includes a second switching means and a current source; and wherein the first switching means and the switchable means can be independently actuated.

* * * * *